US012528165B2

(12) United States Patent
Robinson et al.

(10) Patent No.: US 12,528,165 B2
(45) Date of Patent: Jan. 20, 2026

(54) CLOSED SYSTEM LIFTER

(71) Applicant: Kyocera Senco Industrial Tools, Inc., Cincinnati, OH (US)

(72) Inventors: Derick C. Robinson, Hillsboro, OH (US); Christopher D. Klein, Cincinnati, OH (US)

(73) Assignee: Kyocera Senco Industrial Tools, Inc., Cincinnati, OH (US)

(*) Notice: Subject to any disclaimer, the term of this patent is extended or adjusted under 35 U.S.C. 154(b) by 0 days.

(21) Appl. No.: 18/661,999

(22) Filed: May 13, 2024

(65) Prior Publication Data

US 2024/0391076 A1 Nov. 28, 2024

Related U.S. Application Data

(60) Provisional application No. 63/468,325, filed on May 23, 2023.

(51) Int. Cl.
*B25C 1/04* (2006.01)
*B25C 1/06* (2006.01)

(52) U.S. Cl.
CPC ................ *B25C 1/047* (2013.01); *B25C 1/06* (2013.01)

(58) Field of Classification Search
CPC ........... B25C 1/047; B25C 1/06; B25C 1/008; B25C 1/00; B25C 1/04; B25C 1/001; B25C 1/045; B25C 1/08
See application file for complete search history.

(56) References Cited

U.S. PATENT DOCUMENTS

| | | | | |
|---|---|---|---|---|
| 6,854,530 | B1 | 2/2005 | Yiu | |
| 6,891,457 | B2 | 5/2005 | Sako | |
| 7,537,145 | B2 | 5/2009 | Gross | |
| 7,665,540 | B2 | 2/2010 | Gross | |
| 7,823,654 | B2 | 11/2010 | Kennett | |
| 7,913,890 | B2 | 3/2011 | Gross | |
| 7,918,374 | B2 | 4/2011 | Gardner | |
| 8,104,659 | B2 | 1/2012 | St. John | |
| 8,413,867 | B2 | 4/2013 | Gardner | |
| 8,459,519 | B2 | 6/2013 | Feng | |
| 8,939,340 | B2 | 1/2015 | Gardner | |
| 2005/0088797 | A1 | 4/2005 | Lu | |
| 2005/0167466 | A1 | 8/2005 | Tsai | |
| 2005/0194420 | A1 | 9/2005 | Zahner | |
| 2010/0032468 | A1* | 2/2010 | Gross | B25C 1/06 227/156 |
| 2013/0341057 | A1 | 12/2013 | Moore | |

(Continued)

OTHER PUBLICATIONS

ISA International Search Report, mailed Aug. 8, 2024; 14 pages.

*Primary Examiner* — Veronica Martin
(74) *Attorney, Agent, or Firm* — Frederick H. Gribbell; Russell F. Gribbell; William E. Crouse

(57) ABSTRACT

A fastener driving tool that uses pressurized gas to drive a piston that causes a driver blade to force a fastener into a workpiece, and then uses an induction coil to "lift" the piston (as an armature) back toward the top, pre-drive position. The pressurized gas is not vented to atmosphere, but is instead re-used for multiple drive cycles. An optional induction coil can have multiple stages. A more preferred induction coil includes multiple stages, in which some of those coil stages extend beyond the end stroke of the piston, past a "ready" position for that piston.

20 Claims, 26 Drawing Sheets

(56) References Cited

U.S. PATENT DOCUMENTS

| | | | |
|---|---|---|---|
| 2018/0126527 A1 | 5/2018 | Pomeroy et al. | |
| 2018/0141198 A1 | 5/2018 | Fan | |
| 2021/0237242 A1* | 8/2021 | Carrier | B25C 1/047 |

* cited by examiner

CLOSED SYSTEM LIFTER

CROSS-REFERENCE TO RELATED APPLICATIONS

The present application claims priority to provisional patent application Ser. No. 63/468,325, titled "CLOSED SYSTEM LIFTER," filed on May 23, 2023.

TECHNICAL FIELD

The technology disclosed herein relates generally to fastener driving tools and is particularly directed to such tools of the type which use pressurized gas to drive a piston that, in turn, causes a driver blade to force a fastener into a target workpiece. Embodiments are specifically disclosed which use an electromagnetic field as a closed system lifter to "lift" the driver blade and piston back to a "ready" position.

After a fastener is "driven" into the workpiece, the piston must be lifted to the "ready" position for the next "driving stroke." An induction coil is energized to generate an electromagnetic field that will attract at least a metallic portion of the piston, forcing the piston to lift to the ready position. In this "lifting" role, the piston acts as a movable armature, much like a plunger of a solenoid.

In a second embodiment, a multi-stage induction coil is used to generate an electromagnetic field that will attract at least a metallic portion of the piston. This attraction forces the piston to lift and, as the piston nears each consecutive stage of the multi-stage coil, the next coil stage will energize, while the previous stage will de-energize, thereby lifting the piston to the ready position.

The fastener driving tool's gas system used herein includes a pressure chamber, which is in fluidic communication with a working cylinder that becomes filled with pressurized gas to quickly force a piston and driver through a driving stroke movement, while driving a fastener into a workpiece. The cylinder is at least partially surrounded by the pressure chamber which holds most of the pressurized gas that is used to "fire" the piston. During use, the pressurized gas is not vented to atmosphere, and can be re-used for thousands of cycles. Consequently, when the piston/driver combination undergoes a lifting stroke, the movement of the piston is opposed by that pressurized gas.

In a third embodiment, a multi-stage induction coil is used that at least partially surrounds and extends beyond the working cylinder. The induction coil generates an electromagnetic field that will attract at least a metallic portion of the piston. This attraction forces the piston to lift and, as the piston nears each consecutive stage of the multi-stage coil, the next coil stage will energize, while the previous stage will de-energize, thereby lifting the piston to the ready position.

In a fourth embodiment, a fastener driving tool using line voltage as its power source has a multi-stage induction coil that generates an electromagnetic field that will attract at least a metallic portion of the piston. This attraction forces the piston to lift and, as the piston nears each consecutive stage of the multi-stage coil, the next coil stage (or stages) will be energized, while one or more of the previous stages will de-energize, thereby lifting the piston to the ready position.

STATEMENT REGARDING FEDERALLY SPONSORED RESEARCH OR DEVELOPMENT

None.

BACKGROUND

Many conventional fastener driving tools use a piston to move a driver blade that forces a nail or staple into a target workpiece, as part of their operational cycle. These pistons are typically driven by compressed air, or in some cases, by combustion air. In a product line of pressurized air tools known as FUSION® that are sold by Senco, pressurized air is stored in a main storage chamber and that air is not vented to atmosphere, but instead is re-used multiple times, and can drive multiple driving strokes (including operational cycle counts in the thousands, per charge of pressurized air).

In the conventional tools, mechanical techniques are used to lift the piston from the driven position to the ready position. Such techniques could include: elastic members (i.e., a spring), applying a vacuum, a flywheel, a rack and pinion, or a rotatable lifter with lifter pins (as used in previous FUSION tools sold by Senco). The FUSION fastener driving tools that use the same pressurized air multiple times typically have an electronic controller that controls the overall workings of the tool, and an electric motor, in which the motor provides the motive force (as a prime mover) to lift the movable piston back toward its ready position after it has driven a fastener.

However, a disadvantage to using mechanical techniques for lifting the piston is the potential for a jam condition if the driver does not end its "driving stroke" movement at an expected position.

SUMMARY

Accordingly, it is an advantage to eliminate mechanical and pneumatic techniques used for lifting a piston in a gas-spring driven fastener driving tool.

It is another advantage to provide a gas-spring fastener driving tool with a closed system lifter in which an induction coil is used for lifting a piston after a driving stroke.

It is yet another advantage to provide a gas-spring fastener driving tool with a closed system lifter in which an induction coil is used for lifting a piston away from an exit end of a guide body.

It is a yet further advantage to provide a fastener driving tool with a closed system lifter in which pressurized gas is used to propel a piston/driver blade, and to drive a fastener into a workpiece, and that pressurized gas is re-used and not vented to atmosphere.

It is still a further advantage to provide a gas-spring fastener driving tool with a closed system lifter in which a high-powered portable battery would provide power for the induction coil that is used to lift the piston after a driving stroke.

It is still another advantage to provide a combination fastener driving tool with a closed system lifter that uses pressurized gas to move a piston in a driving stroke to drive a fastener into a workpiece, and then uses electromagnetic force in a lifting stroke to "lift" or return that piston to a "ready" position.

It is a further advantage to provide a fastener driving tool with a closed system lifter in which a latch is used to hold the driver in place at a "ready" position, and that latch also can catch the driver from displacing in a driving direction at times where a fastener has jammed during a driving stroke, and a human user un-jams that fastener, which could otherwise allow the driver to suddenly "shoot" at an inopportune moment.

It is a yet further advantage to provide a gas-spring fastener driving tool with a closed system lifter in which a power cord and an AC/DC power converter provides power for the induction coil that is used to lift the piston after a driving stroke.

Additional advantages and other novel features will be set forth in part in the description that follows and in part will become apparent to those skilled in the art upon examination of the following or may be learned with the practice of the technology disclosed herein.

To achieve the foregoing and other advantages, and in accordance with one aspect, a fastener driving tool with closed system lifter is provided, which comprises: (a) a guide body that has a receiving end, an exit end, and a passageway therebetween, the guide body being physically configured to receive a fastener; (b) a hollow cylinder comprising a cylindrical wall and including a movable piston therewithin, the hollow cylinder including a first end and a second, opposite end, the hollow cylinder containing a displacement volume created by a stroke of the piston; (c) an elongated driver including a first end and a second end, the first end being in mechanical communication with the movable piston, the second end being sized and shaped to push a fastener from the exit end of the guide body; and (d) an induction coil that is wound at least partially around the hollow cylinder; (e) wherein: (i) the displacement volume contains a pressurized gas, and the pressurized gas is not exhausted to atmosphere after a driving stroke, but instead is re-used for a plurality of the operating cycles; (ii) the cylinder and piston act as a gas spring during the driving stroke to move the driver toward a driven position, using the pressurized gas of the displacement volume acting on the piston; and (iii) the induction coil is energized during a lifting stroke of the operating cycle to move the piston by use of a magnetic field toward a ready position.

In accordance with another aspect, a fastener driving tool with closed system lifter is provided, which comprises: a housing that contains a pressurized gas, a hollow cylinder that includes a movable piston, a driver that is in mechanical communication with the piston at least during a driving stroke, an induction coil that is in magnetic communication with the piston at least during a lifting stroke, a mechanical latch, and a source of electrical energy; wherein: the hollow cylinder is configured to use the pressurized gas to propel the piston toward a driven position during the driving stroke; the induction coil is configured use a magnetic field to propel the piston toward a ready position during the lifting stroke; and the latch is configured to hold the driver at the ready position after the lifting stroke.

In accordance with yet another aspect, a method for using a fastener driving tool with closed system lifter is provided, in which the method comprises the following steps: (a) providing a housing that contains a pressurized gas, a hollow cylinder that includes a movable piston, a driver that is in mechanical communication with the piston at least during a driving stroke, an induction coil that is in magnetic communication with the piston at least during a lifting stroke, a magazine with a plurality of fasteners, a mechanical latch, and a source of electrical energy; (b) before actuation of a driving stroke, positioning the latch to hold the driver at a ready position; (c) upon actuation of a driving stroke: (i) engaging the latch to change positions and release the driver; and (ii) by use of the pressurized gas, propelling the piston toward a driven position, thereby moving the driver to force a fastener from the tool's housing; (d) after completion of the driving stroke, initiating a lifting stroke by: (i) energizing the induction coil to produce a magnetic field; (ii) by use of the magnetic field, propelling the piston toward a ready position, thereby moving the driver toward the ready position; and (e) after completion of the lifting stroke: (i) positioning the latch to hold the driver at the ready position, until another driving stroke.

In accordance with still another aspect, a fastener driving tool with closed system lifter is provided, which comprises: a housing that contains a pressurized gas, a hollow cylinder that includes a movable piston, a driver that is in mechanical communication with the piston at least during a driving stroke, an induction coil that is in magnetic communication with the piston at least during a lifting stroke, a mechanical latch, and a source of electrical energy; wherein: the hollow cylinder is configured to use the pressurized gas to propel the piston toward a driven position during the driving stroke; the induction coil is configured use a magnetic field to propel the piston toward a ready position during the lifting stroke; the latch is configured to hold the driver at the ready position; and the induction coil is wound around the hollow cylinder and extends past an end of the hollow cylinder in the direction of the lifting stroke.

Still other advantages will become apparent to those skilled in this art from the following description and drawings wherein there is described and shown a preferred embodiment in one of the best modes contemplated for carrying out the technology. As will be realized, the technology disclosed herein is capable of other different embodiments, and its several details are capable of modification in various, obvious aspects all without departing from its principles. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the technology disclosed herein, and together with the description and claims serve to explain the principles of the technology. In the drawings:

DETAILED DESCRIPTION

Figure 1:
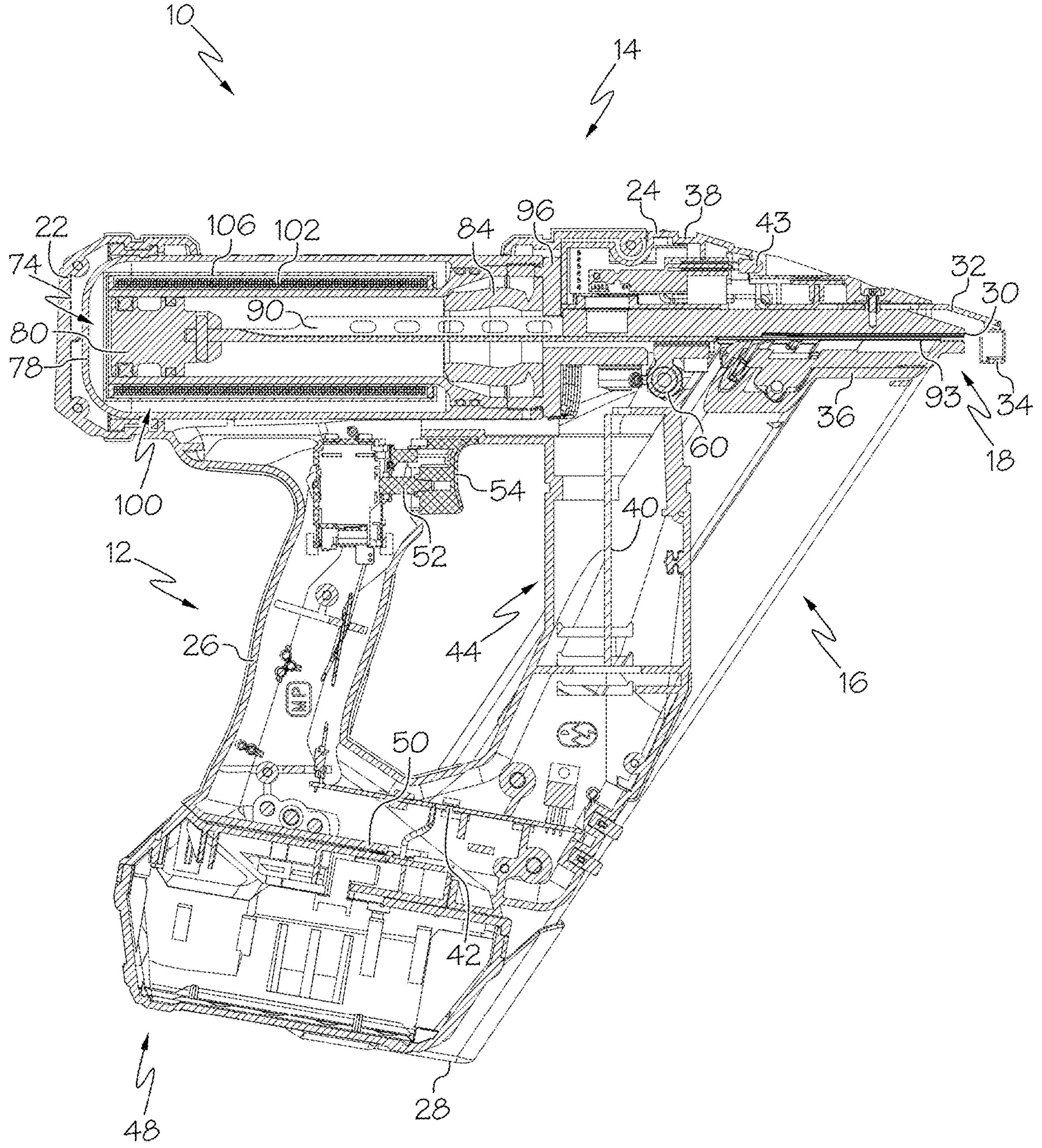
FIG. 1 is a cutaway side view showing the interior portions of a first embodiment fastener driving tool, as constructed according to the principles of the technology disclosed herein, showing a piston/armature at its pre-drive stroke (or "ready") position, and using a single-stage induction coil.

Reference will now be made in detail to the present preferred embodiment, an example of which is illustrated in the accompanying drawings, wherein like numerals indicate the same elements throughout the views.

It is to be understood that the technology disclosed herein is not limited in its application to the details of construction and the arrangement of components set forth in the following description or illustrated in the drawings. The technology disclosed herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings. Furthermore, the terms "communicating with" and "in communications with" refer to two different physical or virtual elements that somehow pass signals or information between each other, whether that transfer of signals or information is direct or whether there are additional physical or virtual elements therebetween that are also involved in that passing of signals or information. Moreover, the term "in communication with" can also refer to a mechanical, hydraulic, or pneumatic system in which one end (a "first end") of the "communication" may be the "cause" of a certain impetus to occur (such as a mechanical movement, or a hydraulic or pneumatic change of state) and the other end (a "second end") of the "communication" may receive the "effect" of that movement/change of state, whether there are intermediate components between the "first end" and the "second end," or not. The same is true for being "in magnetic communication with" something, in which one end of the "communication" may induce a magnetic field, and the other end may receive that magnetic field, and be acted on (or otherwise affected) by that magnetic field.

The terms "first" and "second" preceding an element name, e.g., first inlet, second inlet, etc., are used for identification purposes to distinguish between similar or related elements, results or concepts, and are not intended to necessarily imply order, nor are the terms "first" and "second"

intended to preclude the inclusion of additional similar or related elements, results or concepts, unless otherwise indicated.

In addition, it should be understood that embodiments disclosed herein include both hardware and electronic components or modules that, for purposes of discussion, may be illustrated and described as if the majority of the components were implemented solely in hardware.

However, one of ordinary skill in the art, and based on a reading of this detailed description, would recognize that, in at least one embodiment, the electronic based aspects of the technology disclosed herein may be implemented in software. As such, it should be noted that a plurality of hardware and software-based devices, as well as a plurality of different structural components may be utilized to implement the technology disclosed herein. Furthermore, if software is utilized, then the processing circuit that executes such software can be of a general purpose computer, while fulfilling all the functions that otherwise might be executed by a special purpose computer that could be designed for specifically implementing this technology.

It will be understood that the term "circuit" as used herein can represent an actual electronic circuit, such as an integrated circuit chip (or a portion thereof), or it can represent a function that is performed by a processing circuit, such as a microprocessor or an ASIC that includes a logic state machine or another form of processing element (including a sequential processing circuit). A specific type of circuit could be an analog circuit or a digital circuit of some type, although such a circuit possibly could be implemented in software by a logic state machine or a sequential processor. In other words, if a processing circuit is used to perform a desired function used in the technology disclosed herein (such as a demodulation function), then there might not be a specific "circuit" that could be called a "demodulation circuit;" however, there would be a demodulation "function" that is performed by the software. All of these possibilities are contemplated by the inventors, and are within the principles of the technology when discussing a "circuit."

First Embodiment: Single-Stage Coil

Referring now to FIG. 1, a first embodiment of a fastener driving tool is generally designated by the reference numeral 10. This tool 10 is mainly designed to linearly drive fasteners such as nails and staples. Tool 10 includes a handle portion 12, a fastener driver portion 14, a fastener magazine portion 16, and a fastener exit portion 18.

Figure 5:
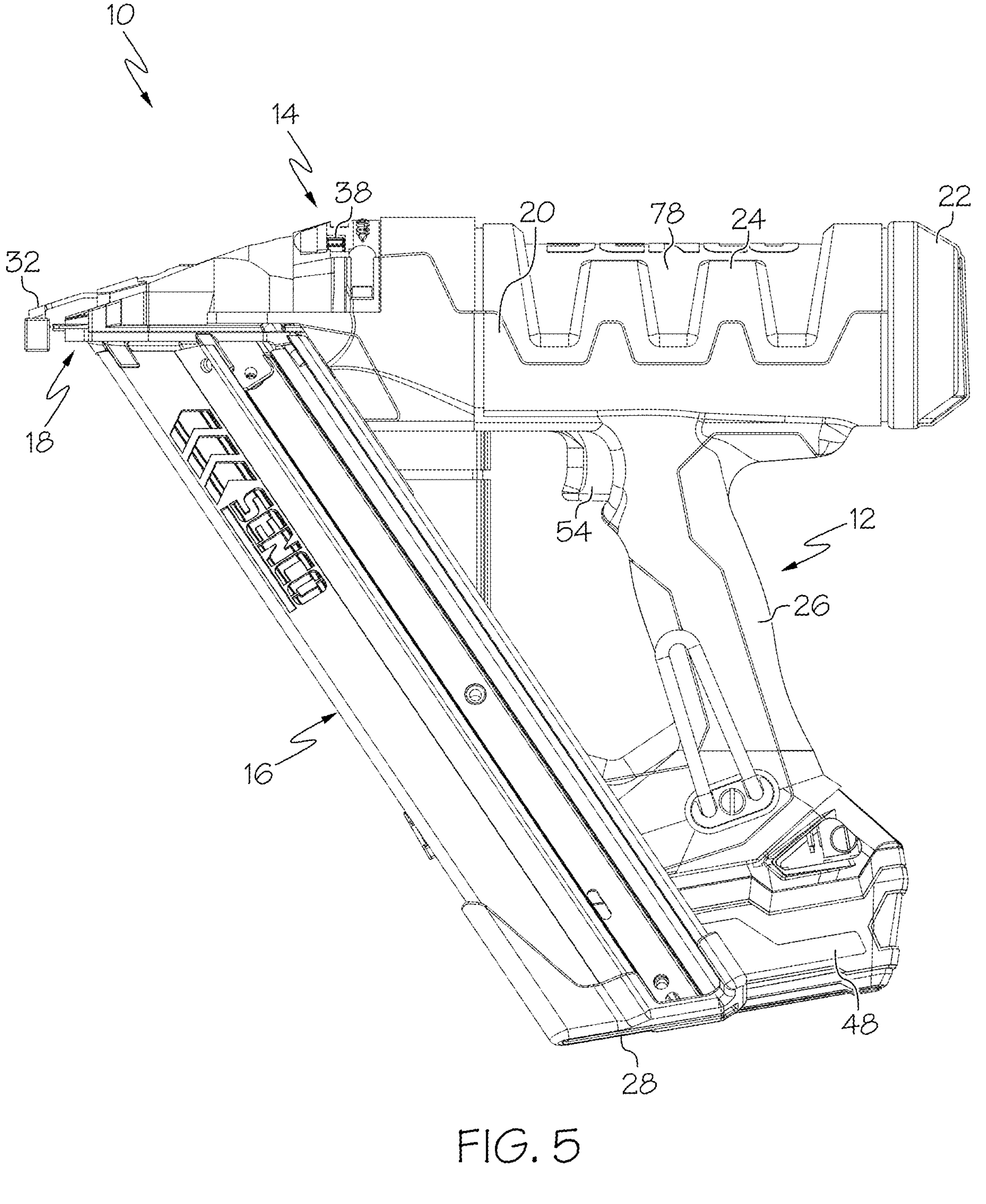
FIG. 5 is a side view of the fastener driving tool of FIG. 1 from the opposite side, showing the entire tool from an exterior view, including all the housing covers, and including the magazine cover.
Figure 6:
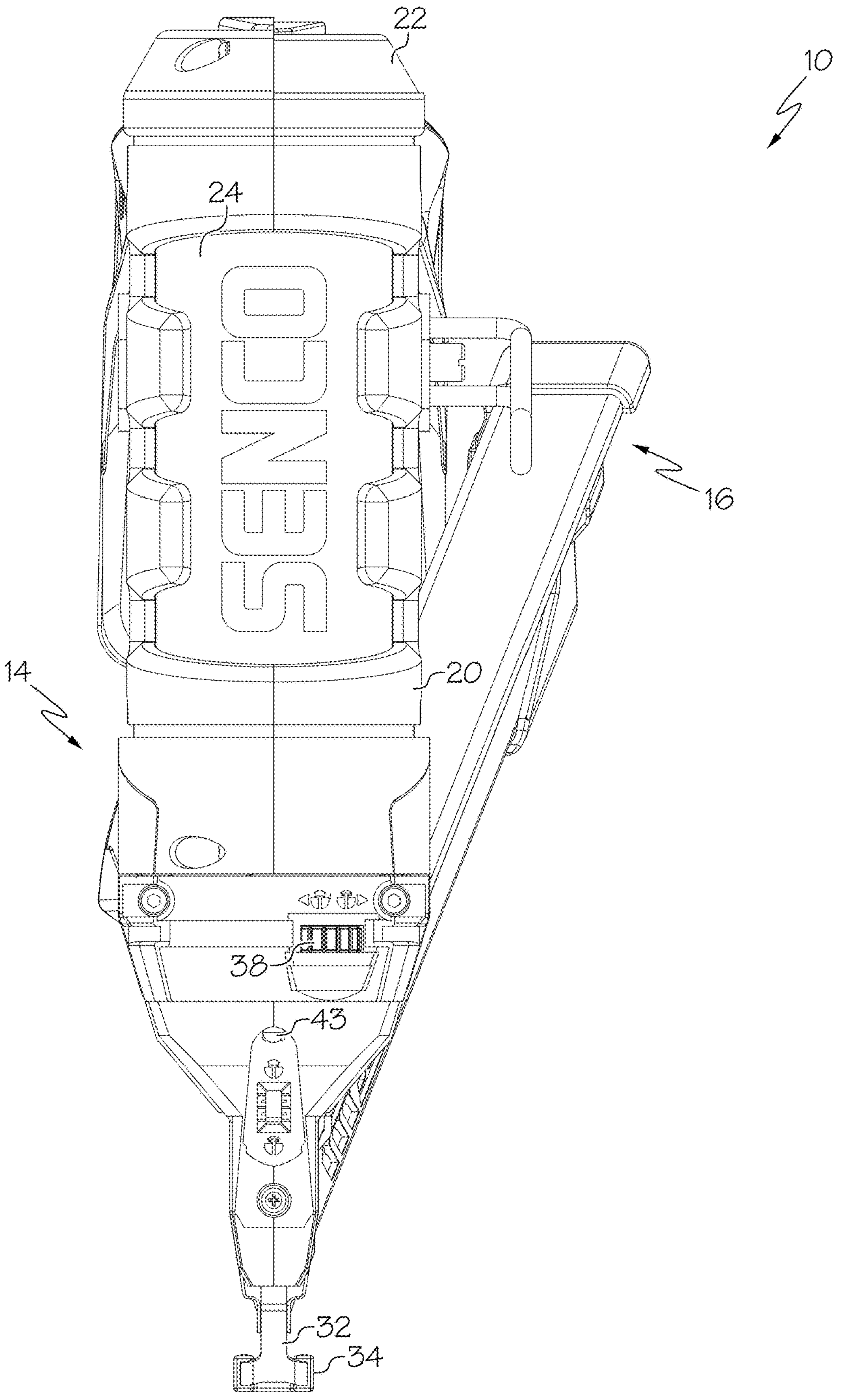
FIG. 6 is a top view of the tool of FIG. 5.

A "left" outer housing portion of the driver portion is indicated at 20—see FIG. 5. A "top" outer housing portion is indicated at 22, while a "front" outer housing portion of the driver portion is indicated at 24. A "rear" outer housing portion for the handle portion is indicated at 26, while a "rear" cover of the magazine portion is indicated at 28. It will be understood that the various directional nomenclature provided above is with respect to the illustration of FIG. 1, and the first embodiment fastener driving tool 10 can be used in many other angular positions, without departing from the principles of this technology.

The area of the tool 10 in which a fastener is released is indicated approximately by the reference numeral 30, which is the "bottom" of the fastener exit portion of tool 10. Before the tool is actuated, a safety contact element 32 extends to or beyond the bottom 30 of the fastener exit, and this extension of the safety contact element (at the reference numeral 34) is the bottommost or "front" portion of the entire tool 10.

Other elements that are depicted in FIG. 1 include a guide body 36 and a depth of drive adjuster 38, which are in mechanical communication with the magazine portion 16. A trigger switch 52 is activated by a trigger actuator 54. The handle portion 12 is designed for gripping by a human hand, and the trigger actuator 54 is designed for linear actuation by a person's finger while gripping the handle portion 12. Trigger switch 52 provides an input to the tool's control system. There are also other input devices used with the system controller, such as a safety contact element switch 56, which is activated when the front end of the tool is pressed against a workpiece, which forces the safety contact element 32 to be pushed "into" the remainder of the tool.

In the illustrated embodiment, the tool 10 includes a light emitting diode (LED) 43 in the front housing 44, which provides some status information to the user of the tool. Additionally, the tool 10 optionally can contain one or more position sensors (not seen in FIG. 1) inside the guide body 36, which can provide certain information about the movements of the driver "blade" 90.

The fastener driving tool 10 also includes an electromagnetic induction coil subassembly, generally designated by the reference numeral 100. The induction coil subassembly 100 includes an induction coil 102, which is a single-stage coil that has a multi-turn winding that is a single, continuous electrical conductor that constitutes a single, rather long inductor. The coil 102 is wound around a bobbin 104, and the coil 102 is partially enclosed by a yoke 106. The bobbin 104 will typically be made of a material that is non-conductive and non-magnetic. The yoke 106 will typically be made of a magnetic material, such as a magnetic soft steel or iron alloy that easily conducts magnetic flux (i.e., a material having a high magnetic permeability, useful for confining and guiding magnetic fields).

In the illustrated embodiment, the bobbin 104 and coil 102 both fit around the outer circumference (or perimeter) of the working cylinder 71; however, it is not required that the entire coil go around the cylinder wall 70, although the induction coil 102 should be wound at least partially around the cylinder, to make a physically smaller device. This type of coil will typically comprise a winding with multiple turns, with most—if not all—of those turns being wound around the cylinder wall 70.

A battery pack 48 is attached near the rear of the handle portion 12, and this battery provides electrical power for the induction coil subassembly 100 as well as for a control system. In the illustrated embodiment of FIG. 1, the battery pack 48 is attached to the very back portion of the handle, just behind the printed circuit board 42 in the illustrated embodiment.

The fastener driving tool 10 disclosed herein uses an induction coil to "lift" the piston and driver from a lower position, which is also referred to as its "driven" position, toward an upper position, which is also referred to sometimes as its "ready" position. The FUSION® nail driving tools that have been sold by Kyocera Senco Industrial Tools, Inc. in the past have used a mechanical "lifter" for this function. In those earlier FUSION® tools, the "front housing" 44 as seen on FIG. 1 was usually referred to as a "motor housing," because that is where the lifter's motor was positioned within the tool housing. In the present embodiment of the fastener driving tool 10, that front housing 44 now contains a printed circuit board 40 with many high-power electronic components, used for providing energy to the induction coil 102. In this design, there will also be other printed circuit boards, at 42 and at 50, for example, which will contain other electronic components also used for controlling the tool 10. Some of these printed circuit boards will also contain more high-energy electronic components, such as switching transducers and storage capacitors, for driving the induction coil 102 with a sufficient energy to perform its lifting function. The circuit board 50 is located inside the battery pack 48, and controls the use of the battery cells.

The piston 80 will also act as an armature, because it is not only acted on by pressurized gas from the main storage chamber 74, but it is also acted on magnetically by the induction coil 102. In other words, when the induction coil 102 is energized, it will generate a magnetic field that tends to "lift" the piston/armature toward the ready position. Consequently, the piston/armature 80 needs to be essentially air-tight around its outer perimeter that fits inside the interior sleeve or cylinder wall 70, and it also needs to be at least partially constructed of a magnetic material, such as soft-steel or a soft-iron alloy, so the magnetic field produced by the induction coil 102 will act on it to force it back "upward" toward the ready position, much as a coil operates on a plunger of a solenoid.

As noted above, the tool 10 includes at least one printed circuit board that contains a system controller, and also carries other electrical and electronic components necessary for proper functioning of the tool. These printed circuit boards 40 and 42 could be positioned almost anywhere inside the "empty" spaces of the housing, including inside the front housing 44 and the bottom portion of the tool, just above the battery pack 48. Another optional feature of this tool would be to include some vents in the housing somewhat near the battery pack, such as in the handle portion 12. These vents could provide some forced cooling air to flow around the printed circuit boards, to help carry away the heat produced by the electronic components, especially those components that provide electrical energy for the induction coil 102. The forced cooling air would be produced each time the piston 80 moved though its travel during a driving stroke and during a lifting (or "return") stroke. Details of this type of cooling air system are provided in another patent application by Kyocera Senco Industrial Tools, Inc., in published patent application No. US 2019/0321955 A1, filed on Aug. 28, 2018, and titled, "FORCED AIR COOLING FROM PISTON MOVEMENTS OF NAILER TOOL."

The tool's system controller will typically include a microprocessor or a microcomputer integrated circuit 150 that acts as a processing circuit. At least one memory circuit 152 will also typically be part of the controller, including Random Access Memory (RAM) and Read Only Memory (ROM) devices. To store user-inputted information (if applicable for a particular tool model), a non-volatile memory device would typically be included, such as EEPROM, NVRAM, or a Flash memory device. In general, the memory circuit 152 will contain instructions that are executable by the processing circuit 150.

The processing circuit communicates with external inputs and outputs, which it does by use of an input/output (I/O) interface circuit 154. The processing circuit, memory circuit, and the interface (I/O) circuit communicate with one another via a system bus 156, which carries address lines, data lines, and various other signal lines, including interrupts. The I/O circuit has the appropriate electronics to communicate with various external devices, including input-type devices, such as sensors and user-controlled switches, as well as output-type devices, such as a motor and indicator lamps. The signals between the I/O interface circuit and the actual input and output devices are carried by signal pathways 158, typically a number of electrical conductors.

Some of the output devices may include an induction coil 102, a latch solenoid 68, and a light emitting diode 43, which could potentially be replaced with an audio output device, such as a Sonalert. Each of the output devices will typically have a driver circuit, such as a coil driver circuit 160 for the induction coil 102, and a latch solenoid driver 162 for the latch solenoid 68, which controls the position of the latch 60.

The latch 60 presses against the driver 90 under certain conditions. Latch 60 has an engagement extension that presses directly against one of the surfaces of the driver 90, so that when an opening 92 in the driver is encountered by the latch 60, the latch will (via spring force) be forced into that opening. If that occurs, the driver will be allowed to travel "downward" (in the direction of a driving stroke) only to the point where the latch contacts the "end" of the opening 92. See FIG. 2 for an example of the placements and relative sizes of these driver blade openings 92.

Note that the driver blade could, alternatively, use protrusions (not shown) instead of openings to engage with the latch 60. In that type of alternative design, the driver would have a plurality of spaced-apart protrusions, and when the latch was to be engaged to prevent further driver movement "downward," the latch would be moved toward that portion of the driver so it could mechanically interfere against one of those protrusions of the alternative driver design. This alternative design for a driver is described and illustrated in other patents owned by Senco, particularly for earlier versions of the FUSION fastener driving tool. Those patents are incorporated by reference herein, as noted below. The important principle regarding the driver and latch interface is that the driver should have some type of irregular shape-rather than a purely smooth surface-so that the latch can easily "grab" that driver (via its irregular shape), and thus prevent the driver from continuing "down" in a situation where the driver should not be moving in that direction.

In one mode of operation, the latch 60 will allow the driver to be raised upward, but will not allow the driver to be moved downward. As such, the latch 60 can act as a safety device in this first mode. In a second mode of operation, the latch also acts as a "release device" that allows the driver to begin a driving stroke so as to drive a fastener into a workpiece. In any event, the latch 60 will be deployed after each "lifting stroke" to hold the driver at its "ready position" until it is time for the next "driving stroke" to occur-under the control of the tool's human user.

Figure 15:
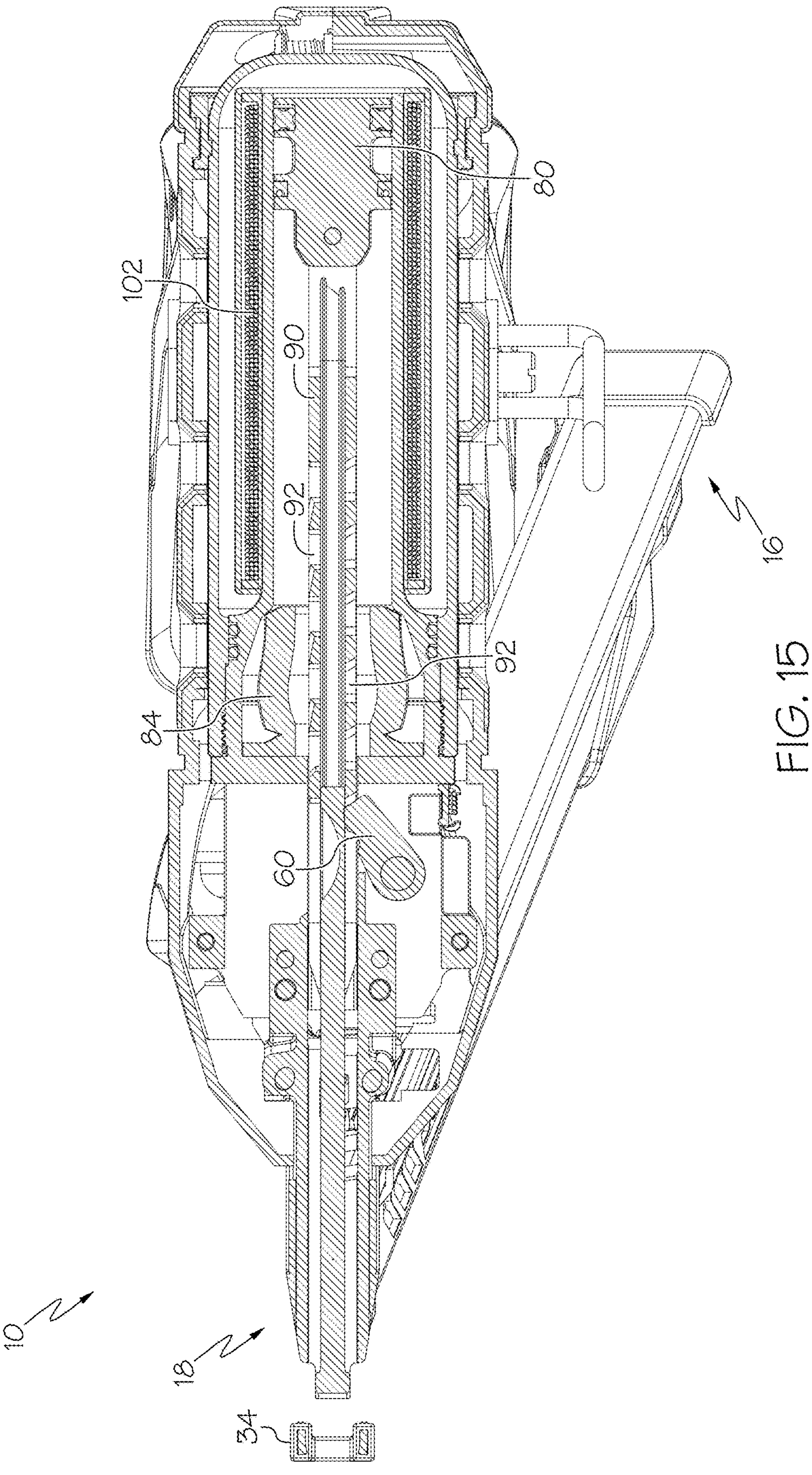
FIG. 15 is a cutaway top view showing some of the interior portions of the first embodiment fastener driving tool of FIG. 1, in which the driver/piston is located at its "ready" position, and the latch is engaged in an interfering relationship with a driver opening, thereby holding the driver/piston at the ready position.

Additional details of the latch 60 are illustrated in FIGS. 15-20. In FIG. 15, the latch 60 is holding the driver/piston combination at its "up" or "ready" position, by engaging into one of the driver openings 92. This is the "first operating state" of the latch 60, and it occurs during the "higher pressure" situation for the pressurized gas system of tool 10. The latch solenoid 68 must be actuated to withdraw the latch (by pivot action) from that driver opening 92, thereby allowing the driver/piston to undergo a driving stroke due to the pressurized gas in the displacement volume 76. When the latch releases the driver by pivoting to a non-interfering position, that is the "second operating state" of the latch 60, which occurs only during a driving stroke, as described below in greater detail.

Figure 16:
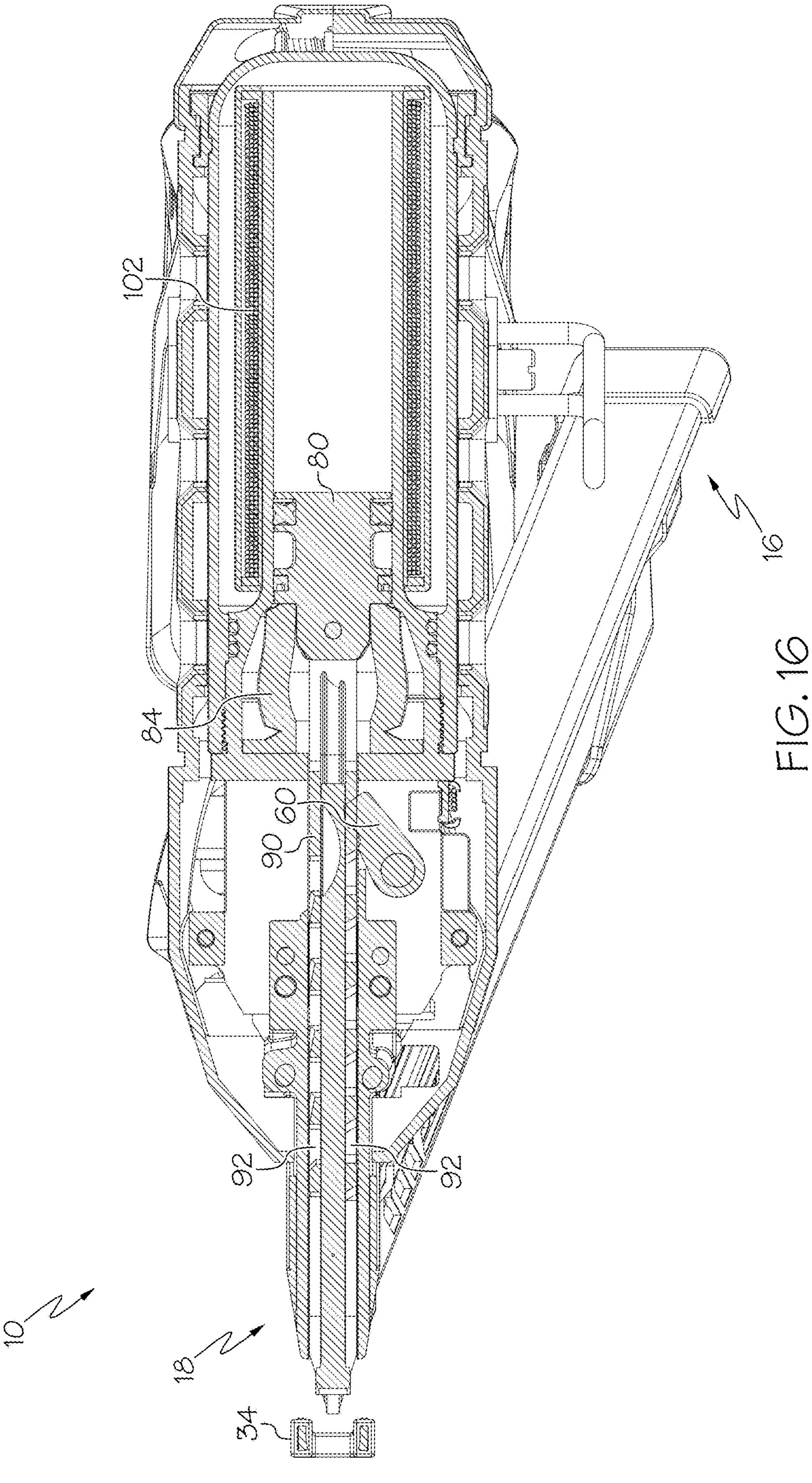
FIG. 16 is a cutaway top view showing some of the interior portions of the first embodiment fastener driving tool of FIG. 1, in which the driver/piston is located at its "driven" position, and the latch is engaged in an interfering relationship with a driver opening, thereby temporarily holding the driver/piston just before a lifting stroke begins.

In FIG. 16, the driver/piston is located at its "down" or "driven" position, and the latch 60 is momentarily engaged in an interfering relationship with a driver opening 92, thereby temporarily holding the driver/piston just before a lifting stroke begins. This is the lower pressure situation for the pressurized gas system of tool 10. If desired, the physical shape of the spring-loaded latch 60 can allow the driver to “slip” upward, without using the solenoid to withdraw the latch 60.

Figure 19:
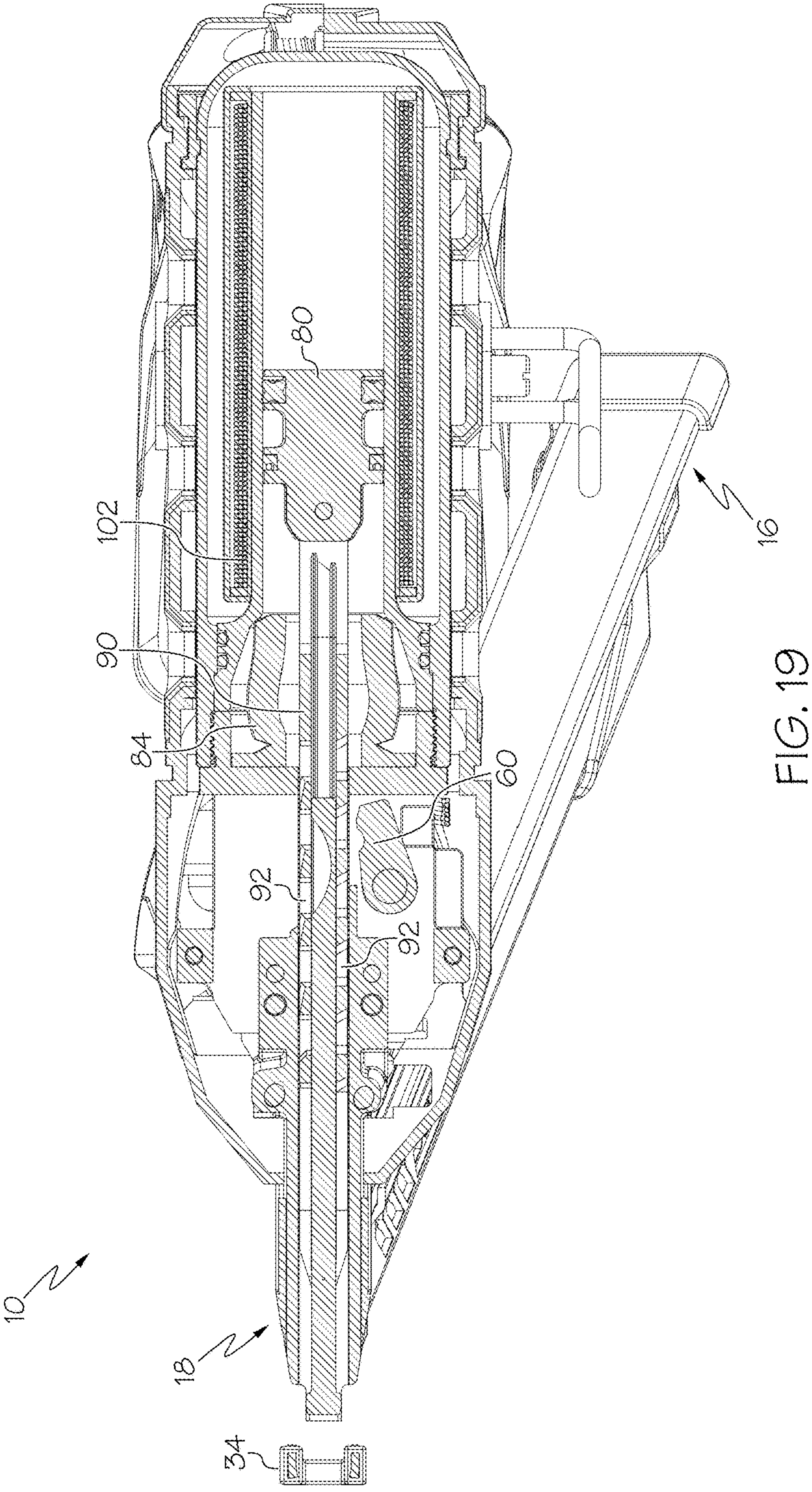
FIG. 19 is a cutaway top view showing some of the interior portions of the first embodiment fastener driving tool of FIG. 1, in which the driver/piston is moving in a driving stroke, and is part-way between its "ready" and "driven" positions; the latch solenoid has been energized, which forces the latch to a non-interfering relationship with respect to the driver, thereby allowing the driving stroke to take place.

In FIG. 19, the driver/piston is moving in a driving stroke, and is illustrated as being part-way between its “ready” and “driven” positions in this view. The latch solenoid has been energized, which forces the latch to a non-interfering relationship with respect to the driver, thereby allowing the driving stroke to take place. In the Senco FUSION line of nail-driving tools, the latch solenoid is energized only for a brief time interval, and then automatically de-energizes at the end of that time interval. During a “normal” driving stroke, the latch will be held “open” (as illustrated in FIG. 19) throughout the entire driving stroke, as a nail (or other type of fastener, such as a staple) is completely driven into a target workpiece.

Figure 20:
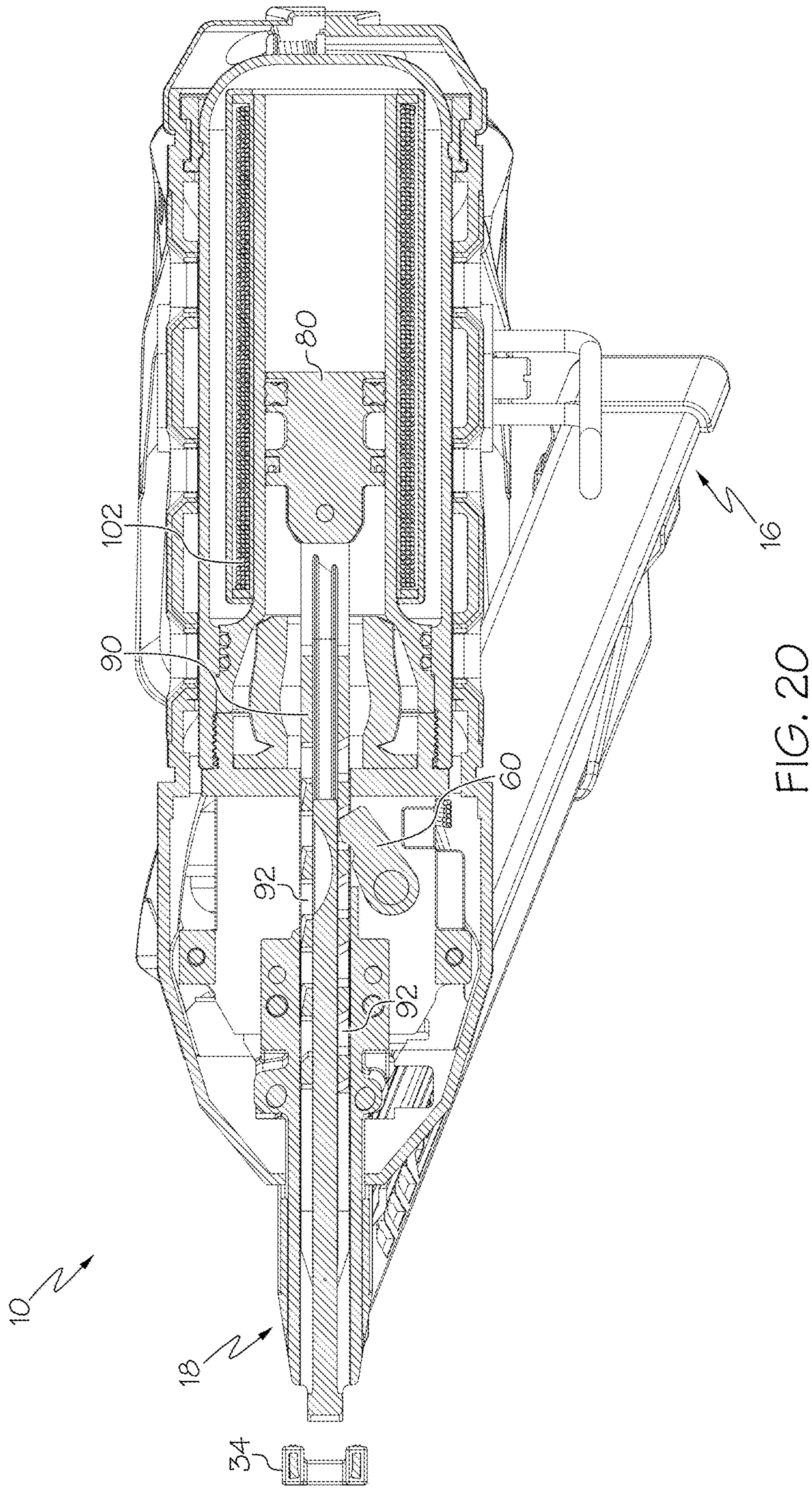
FIG. 20 is a cutaway top view showing some of the interior portions of the first embodiment fastener driving tool of FIG. 1, in which the driver/piston is located part-way between its "ready" and "driven" positions; and the latch is engaged in an interfering relationship with a driver opening, thereby holding the driver/piston at this part-way position, which can occur if a nail being driven somehow causes a jam condition to occur.

In FIG. 20, the driver/piston is again illustrated as being part-way between its “ready” and “driven” positions. However, the latch 60 in this view is engaged in an interfering relationship with a driver opening 92, thereby holding the driver/piston at this part-way position. This view depicts a situation that can occur if a nail being driven somehow causes a jam condition to occur, and the driver is prevented from completing its full “normal” driving stroke to arrive at the nominal driven position. In such a jam situation, the timer that controls the amount of time the latch solenoid 68 is nominally energized will eventually time out, and then the latch 60 will be released. The spring-loaded pivot action will then cause the latch to engage against the driver 90. In FIG. 20, that spring-loaded pivot action forces the latch to engage into one of the driver openings 92, and when that occurs, the driver cannot move any farther “downward” (toward its driven position).

It should be noted that, even after a “jam condition” has occurred, as illustrated in FIG. 20, the driver 90 will nevertheless be able to be lifted “upward” (toward its ready position), because the induction coil 102 will force that upward movement to occur regardless of whether or not the driver/piston stopped movement in an abnormal position during the previous driving stroke. The physical orientation of the pivotable latch 60 and the shape of the driver openings 92 allows the driver to move “upward” when the latch solenoid is de-energized, and while the latch is attempting to be engaged with a driver opening. In the illustrated design, the latch will “slide” along the longitudinal side of the driver as the driver is being lifted toward the ready position. When a driver opening 92 is encountered during a lifting stroke, the latch 60 will tend to briefly enter that opening, but because of the mechanical design, the driver will not be prevented from continuing its “upward” movement. This feature is similar to earlier versions of Senco’s FUSION tools.

The latch action described above, in reference to this first embodiment illustrated in FIGS. 15, 16, 19, and 20, also applies to a second embodiment tool described below, and illustrated in FIGS. 17 and 18.

An LED driver circuit 164 which could be a dual-direction driver circuit if the LED was a bi-directional device. Such a device might be desirable, and red and green LEDs are common devices, in which current in a first direction will produce a red indicator lamp signal, while reversing the current would produce a green indicator lamp signal.

The input devices for tool 10 can include various sensors, including the trigger switch 52 and safety contact element switch 56. If such switches are standard electromechanical devices (such as limit switches), then typically no driver circuit is necessary. However, if the trigger switch and safety element switch were to be replaced by solid state sensing elements, then some type of interface circuits (at 166 and 168) could be needed.

As noted above, the tool 10 may also include position sensors that can detect certain physical positions of a mechanical driver 90. These sensors may be referred to as an “UP sensor” 4, and a “DOWN sensor” 2. If provided, it is desired that these two sensors are “non-contact” devices, such as optical sensors; each one could have a light-emitting lamp (such as a LED) and a light-sensitive detecting element (such as a photodiode). Alternatively, these sensors could be magnetic sensing devices, such as Hall effect sensors, with at least one small permanent magnet affixed to the driver. Such position sensors may require a signal conditioning circuit, such as depicted at 170 and 172 on FIG. 11.

If provided, the UP and DOWN position sensors could to be located in small cylindrical areas near a driver track 93. The driver 90 of the illustrated embodiment includes several openings 92, which are used to engage with the latch 60. When the driver undergoes a lifting stroke, as it reaches near its top position in the driver track, the latch 60 will be activated so as to extend and make physical contact into one of the driver openings 92. At this point, the driver (and piston) will be held at its “ready” position, and will continue to be held at that ready position until the tool is again activated by user manipulation to cause another driving stroke. Thus, the driver and piston are held at a relatively high pressure at all times when the tool is “waiting” to be used, but by selecting this mode of operation, the tool is almost immediately ready for use to drive a fastener. In other words, the entire driving cycle begins with a driving stroke, which is then followed by a lifting stroke to complete the driving cycle; therefore, the user need not wait for a lifting stroke to occur first, once the user activates the trigger. More specifically, the next driving stroke can quickly commence when the human user pulls the trigger 54 and also presses the bottom of the tool (at the safety contact element 32—its front end at 34) against a target workpiece.

Additional input and output devices could be included with the fastener driving tool 10, if desired. For example, a small display could be added, to show certain information about usage or the condition of the tool. However, the indicator light 43 can also be used to show the system status for a small number of various conditions. Other types of sensing devices or output devices could also be added, if desired by the system designer, without departing from the principles of the technology disclosed herein.

It should be noted that some of the sensors described herein are optional. The tool 10 can operated quite well without many of these sensors, including the UP and DOWN position sensors, which provide for an improved tool in many respects, but are not entirely necessary if one wishes to sell a lesser expensive tool, for example.

A working cylinder subassembly is designated by the reference numeral 71, and this is included as part of the fastener driver portion 14. As viewed on FIG. 2, the working cylinder 71 includes a cylinder wall 70, and within this cylinder wall 70 is a movable piston 80, and a stationary piston stop 84. Part of the piston mechanism of this embodiment includes a piston seal 86 and a piston guide ring 88. Partially surrounding, in the illustrated embodiment, the cylinder wall 70 is a main storage chamber 74 (also sometimes referred to herein as a “pressure vessel storage space”) and an outer pressure vessel wall 78. The top-most portion of the working cylinder is indicated at 72, as seen on FIG. 2, for example, of the fastener driver portion 14.

Also within the fastener driver portion 14 are mechanisms that will actually drive a fastener into a solid object. This includes the driver 90, a cylinder "venting chamber" 75 (which would typically always be at atmospheric pressure), the driver track 93, and the latch 60. Note that the driver track 93 also operates as a fastener track, in that the lower portion of the overall passageway through the guide body that guides the driver also guides the fastener. More specifically, the passageway through the guide body is designed to receive a fastener (such as a nail) from the magazine 16 at a "receiving end" of that portion of the overall track 93, and then the driver 90 pushes that fastener through the lower portion of the overall track (or passageway) 93 until the fastener reaches an "exit end" at reference numeral 30, at which time that fastener will be driven into the target workpiece. In a typical nailer tool, the magazine will hold a large number of nails, and feeds only a single nail to the fastener track for a given driving stroke; this occurs automatically, without any further action by the human user (except to operate the trigger and push the front end of the tool against a workpiece), once the magazine 16 has been mounted onto the tool 10.

Driver 90 is rather elongated; the main body of its elongated face is substantially rectangular. There are multiple openings 92 that are positioned along the longitudinal surfaces of the driver. In the illustrated embodiment, these openings extend in a parallel direction to the longitudinal centerline of driver 90, and they are spaced-apart from one another along the longitudinal surface of the driver 90. It will be understood that the precise positions for the openings 92 could be different from those illustrated for the driver 90 without departing from the principles of the technology disclosed herein.

The latch 60 is designed to "catch" the driver 90 at times when the driver should not be allowed to move through an entire "driving stroke." The latch has a catching portion that can engage with an opening 92 of the driver 90, when the latch is moved to its engaged, or "interfering" position. When a driving stroke is to occur, the latch is pivoted so that its catching surface is moved to its "disengaged" position, which is out of the way of the driver, and thus its catching surface will not interfere with any of the driver's openings 92. An exemplary embodiment of a similar latch that engages with driver protrusions (rather than driver openings) is fully described in U.S. Pat. No. 8,011,441, owned by Senco Brands, Inc., which is incorporated herein by reference in its entirety.

There is a cylinder base 96 that mainly separates the gas pressure portions of the fastener driver portion 14 from the lower mechanical portions of that driver portion 14. The portion of the variable volume that is below the piston 80 is also referred to as a cylinder venting chamber 75, which is vented to atmosphere. In one form of an exemplary embodiment, a vent (not shown) near the cylinder base 96 is used for venting to atmosphere. In an alternative form of an exemplary embodiment, one or more vents (not shown) are placed in the handle portion 12, so as to force cooling air past the printed circuit boards, as discussed above.

Figure 2:
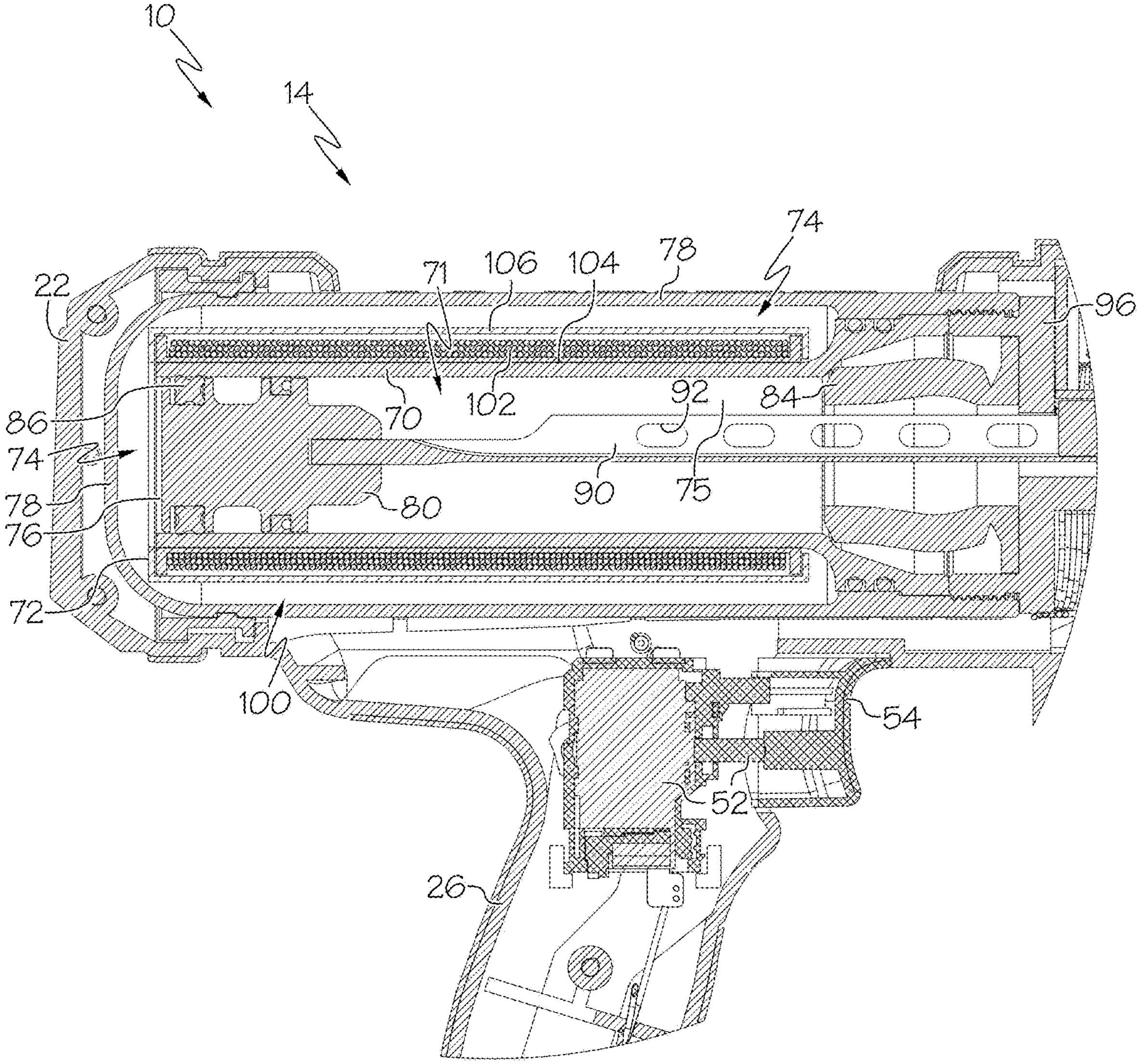
FIG. 2 is an enlarged cutaway side view showing some of the interior portions of the first embodiment fastener driving tool of FIG. 1.

In FIG. 2, the piston 80 is near or at its uppermost or top-most position, and a small gas pressure chamber 76 can be seen above the top-most area of the piston, above the piston seal 86. It will be understood that the gas pressure chamber 76 and the main storage chamber (or storage space) 74 are in fluidic communication with one another. It will also be understood that the portion to the interior of the cylinder wall 70 forms a displacement volume that is created by the stroke of the piston 80. In other words, the gas pressure chamber 76 is not a fixed volume, but this chamber will vary in volume as the piston 80 moves up and down (as seen when comparing FIG. 2 to FIG. 4). This type of mechanical arrangement is often referred to as a "displacement volume," and that terminology will mainly be used herein for this non-fixed volume 76.

It will be further understood that the main storage chamber 74 preferably comprises a fixed volume, which typically would make it less expensive to manufacture; however, it is not an absolute requirement that the main storage chamber actually be of a fixed volume. It would be possible to allow a portion of this chamber 74 to deform in size and/or shape so that the size of its volume would actually change, during operation of the tool, without departing from the principles of the technology disclosed herein.

In the illustrated embodiment for the first embodiment fastener driving tool 10, the main storage chamber 74 substantially surrounds the working cylinder 71. Moreover, the main storage chamber 74 is annular in shape, and it is basically co-axial with the cylinder 71. This is a preferred configuration of the illustrated first embodiment, but it will be understood that alternative physical arrangements could be designed without departing from the principles of the technology disclosed herein.

At the bottom of the handle 12, the enclosure (or housing) 26 widens in cross-sectional area to allow for the printed circuit board 42. This electronic control circuit and the coil driver circuits not only contains intelligent electronics, such as that found in a microprocessor or a microcontroller, but also contains switching semiconductors that control the current and voltage being supplied to the induction coil 102, and therefore can run quite hot. The prospective use of forced cooling air, as described above, can assist in reducing the overall temperature in the interior spaces of the tool's housing.

Figure 3:
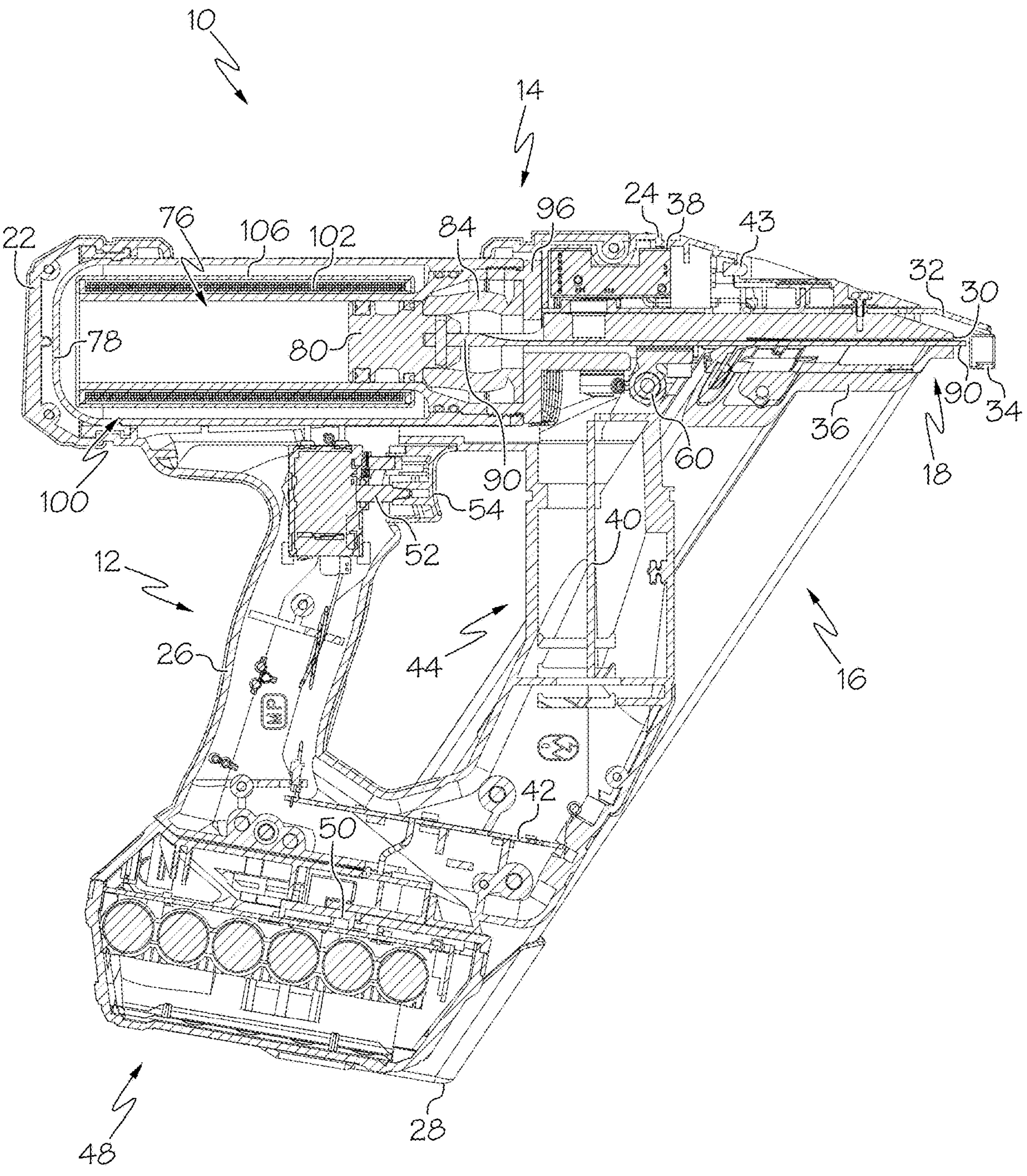
FIG. 3 is a cutaway side view showing the interior portions of the first embodiment fastener driving tool of FIG. 1, in which the driver/armature is shown after a driving stroke (at its post-drive stroke, or "driven," position).
Figure 4:
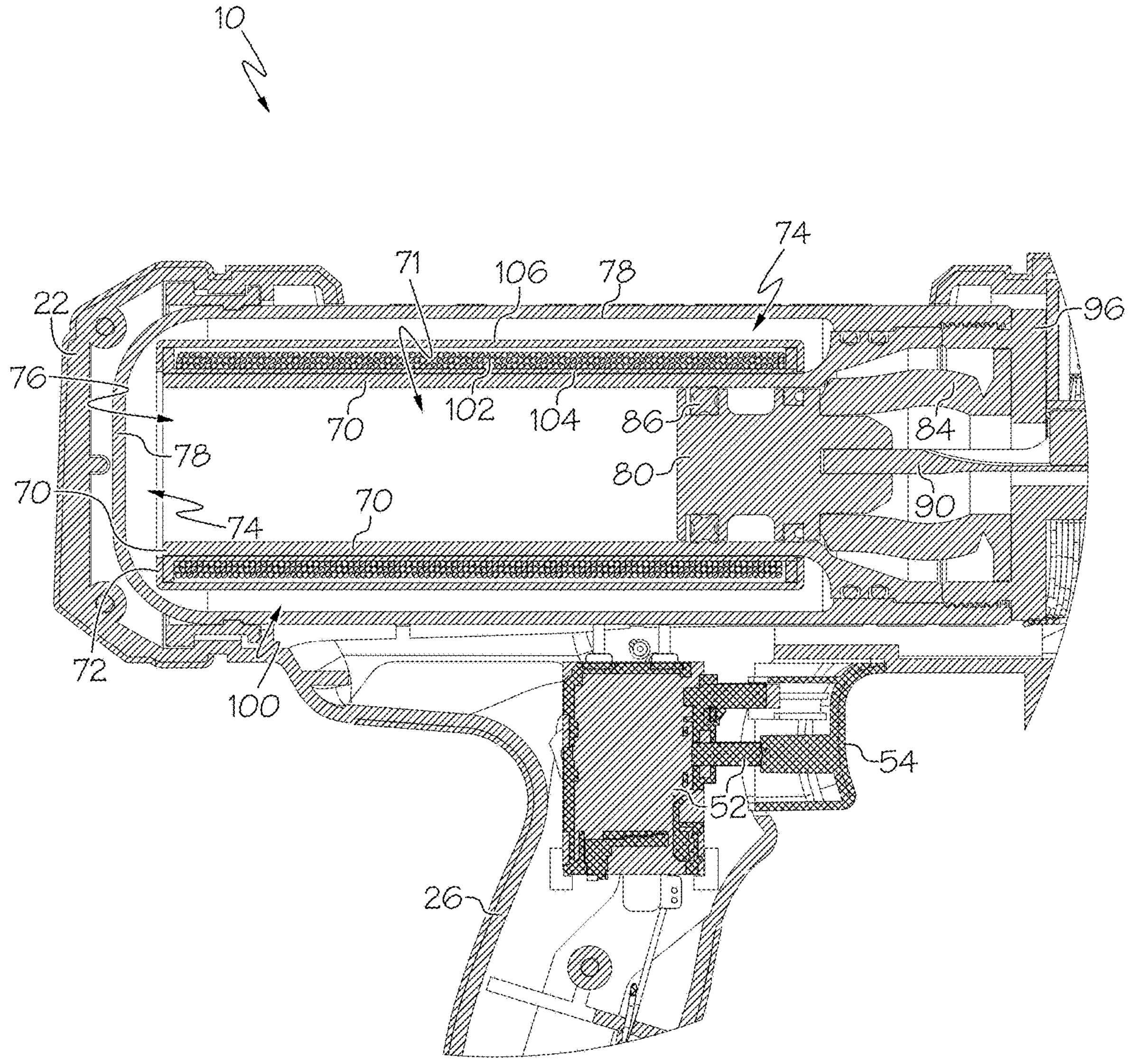
FIG. 4 is an enlarged cutaway side view showing some of the interior portions of the first embodiment fastener driving tool of FIG. 3, after the driving stroke.

Referring now to FIG. 3, essentially the same components are illustrated as in FIG. 1. However, in FIG. 3, the piston/armature 80 is depicted in its "down" position, after a driving stroke has taken place. In FIG. 1, of course, the piston/armature 80 was illustrated in its "ready" or "up" position, before a driving stroke has taken place. FIG. 4 is an enlarged view of a portion of FIG. 3, just like FIG. 2 was an enlarged portion of FIG. 1.

Note that some of the embodiments illustrated herein do not have all of their components included on some of the figures herein, for purposes of clarity. To see examples of such outer housings and other components, especially for earlier designs, the reader is directed to other U.S. patents and applications owned by Senco. Similarly, information about "how" the electronic controller operates to control the functions of the tool is found in other U.S. patents and applications owned by Senco. Moreover, other aspects of the present tool technology may have been present in earlier fastener driving tools sold by the Assignee, Kyocera Senco Industrial Tools, Inc., including information disclosed in previous U.S. patents and published applications. Examples of such publications are patent numbers U.S. Pat. Nos. 6,431,425; 5,927,585; 5,918,788; 5,732,870; 4,986,164; 4,679,719; 8,011,547, 8,267,296, 8,267,297, 8,011,441, 8,387,718, 8,286,722, 8,230,941, and 8,763,874; also published U.S. patent application No. 2016/0288305 and published U.S. patent application, No. 2018/0178361. These documents are incorporated by reference herein, in their entirety.

Second Embodiment: Multi-Stage Coil

Figure 7:
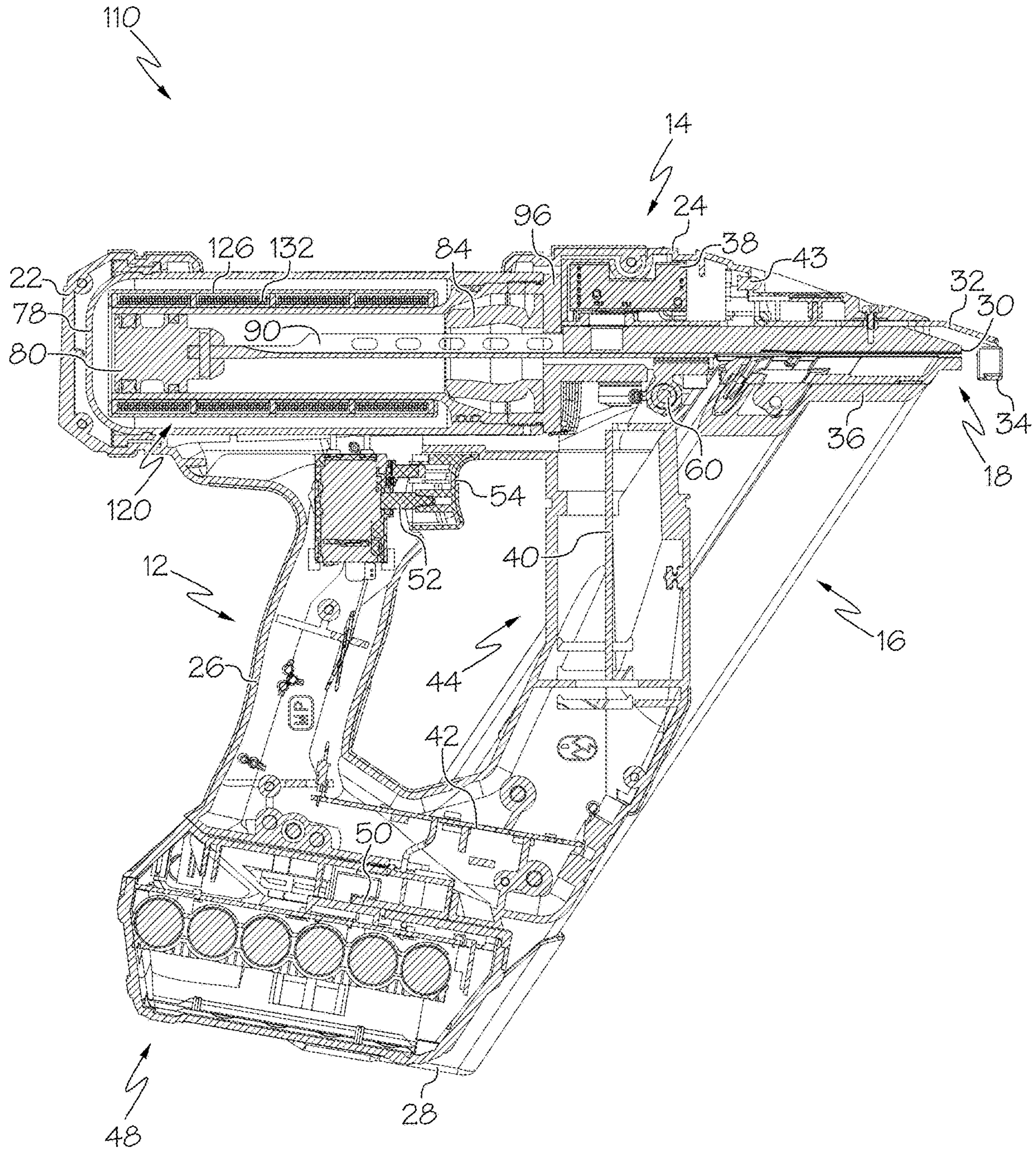
FIG. 7 is a cutaway side view showing the interior portions of a second embodiment fastener driving tool, as constructed according to the principles of the technology disclosed herein, showing a piston/armature at its pre-drive stroke (or "ready") position, and using a multi-stage induction coil.

Referring now to FIG. 7, a second embodiment fastener driving tool is illustrated, generally designated by the reference numeral 110. This tool is very similar to the first embodiment 10 that is depicted in FIGS. 1-4, but this second embodiment includes a multi-stage induction coil, which is part of a subassembly that is generally designated by the reference numeral 120.

Figure 8:
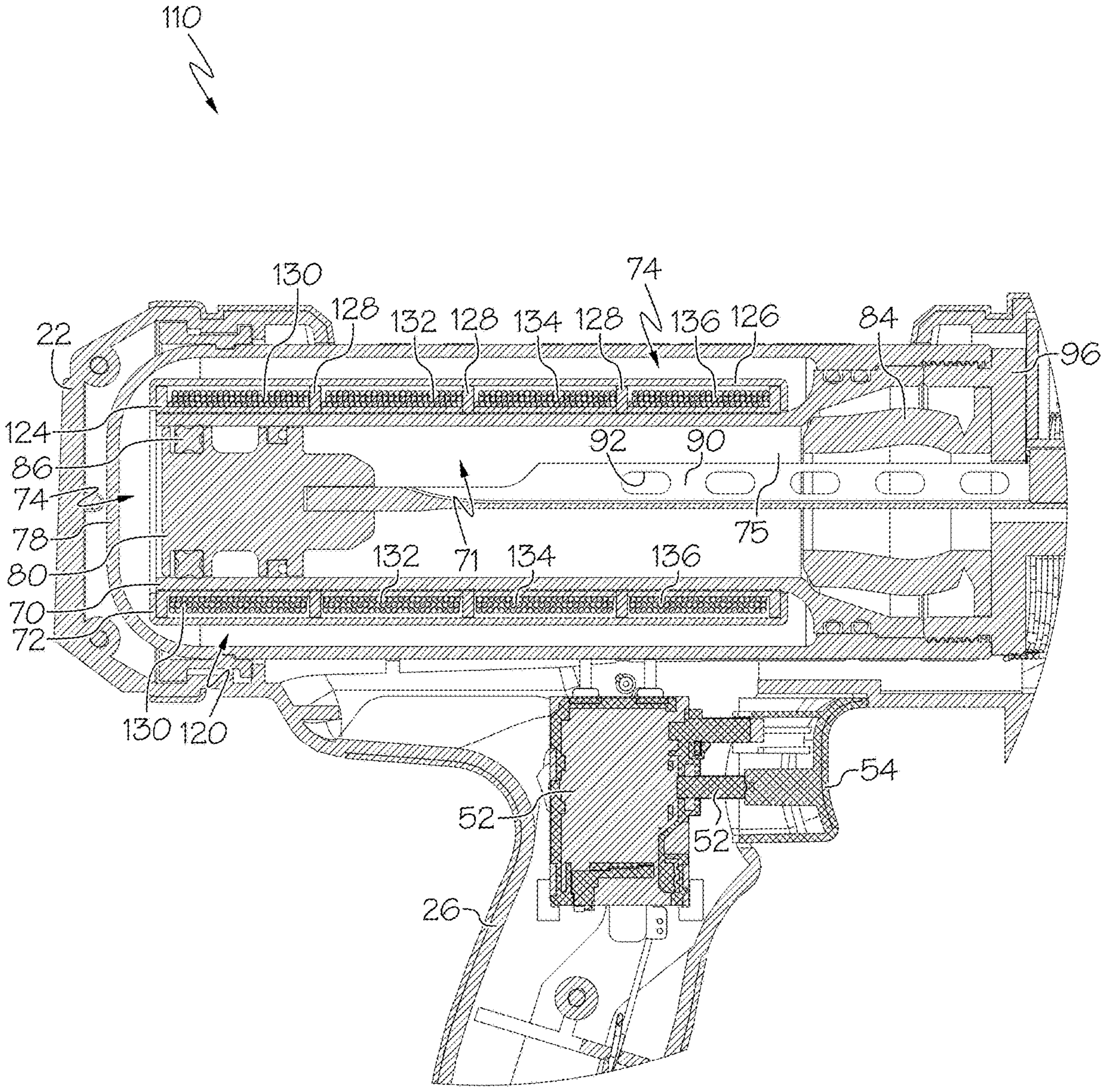
FIG. 8 is an enlarged cutaway side view showing some of the interior portions of the second embodiment fastener driving tool of FIG. 7.

The multi-stage induction coil is illustrated in greater detail in FIG. 8, and the overall designation of the multi-stage coil is at reference numeral 122. The subassembly 120 also includes a bobbin 124, a yoke 126, and a few annular spacers 128. The individual coil windings themselves are designated at reference numerals 130, 132, 134, and 136, which correspond to four (4) separate induction coils. Each of these induction coils is a separate electrical inductor comprising a single multi-turn winding (i.e., they are electrically separate windings), and each coil is designed to impart a magnetic force on the piston/armature 80 at the appropriate time during a lifting stroke. The bobbin 124 and yoke 126 are essentially the same parts that were described above in reference to FIGS. 1-4. The spacers 128 are merely mechanical constructs to physically separate the four different induction coils, as illustrated on FIG. 8. Again, the bobbin will typically be made of a material that is non-conductive and non-magnetic, and the yoke will typically be made of a magnetic material (having a high magnetic permeability).

Figure 9:
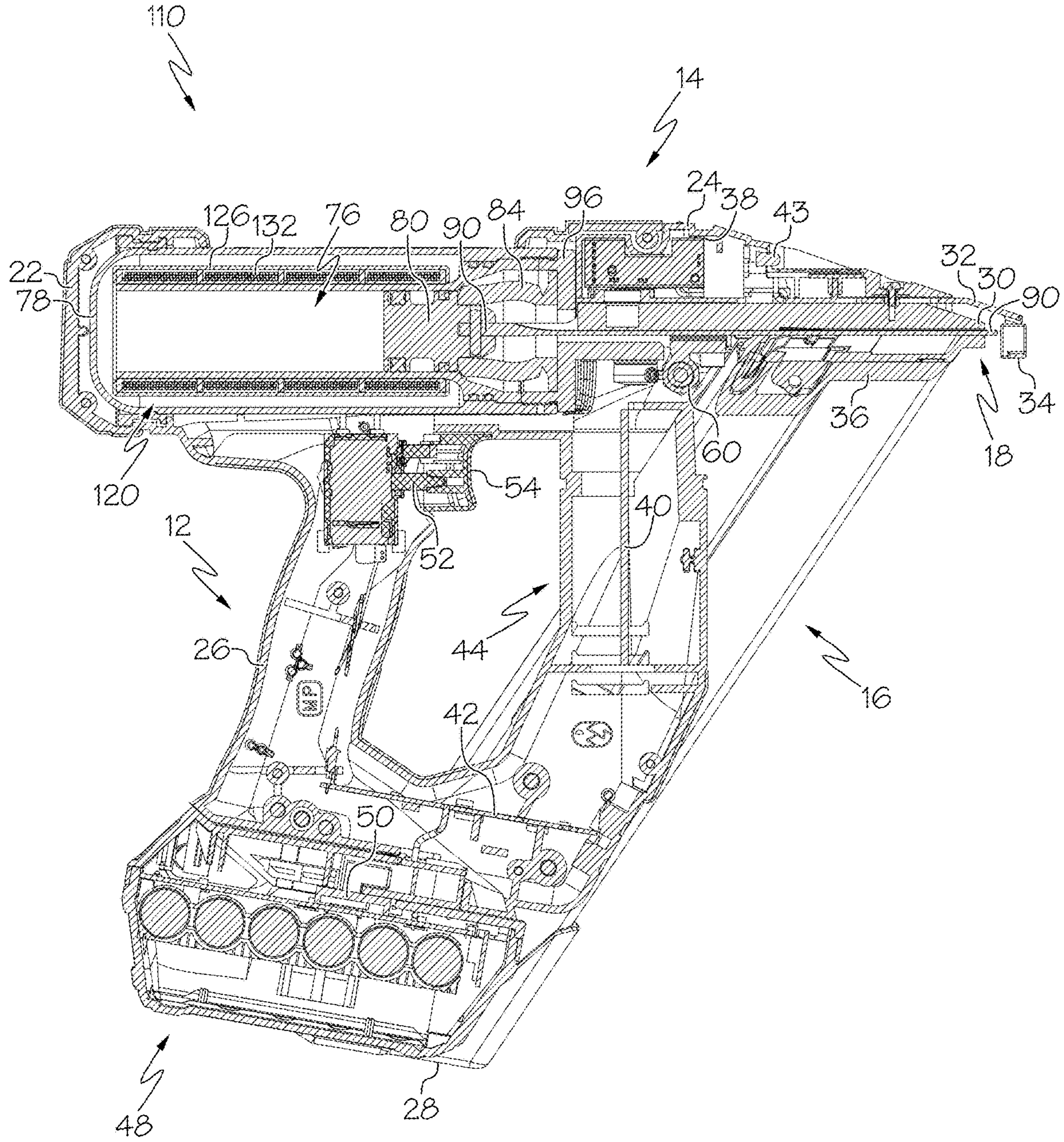
FIG. 9 is a cutaway side view showing the interior portions of the second embodiment fastener driving tool of FIG. 7, in which the driver/armature is shown after a driving stroke (at its post-drive stroke, or "driven," position).
Figure 10:
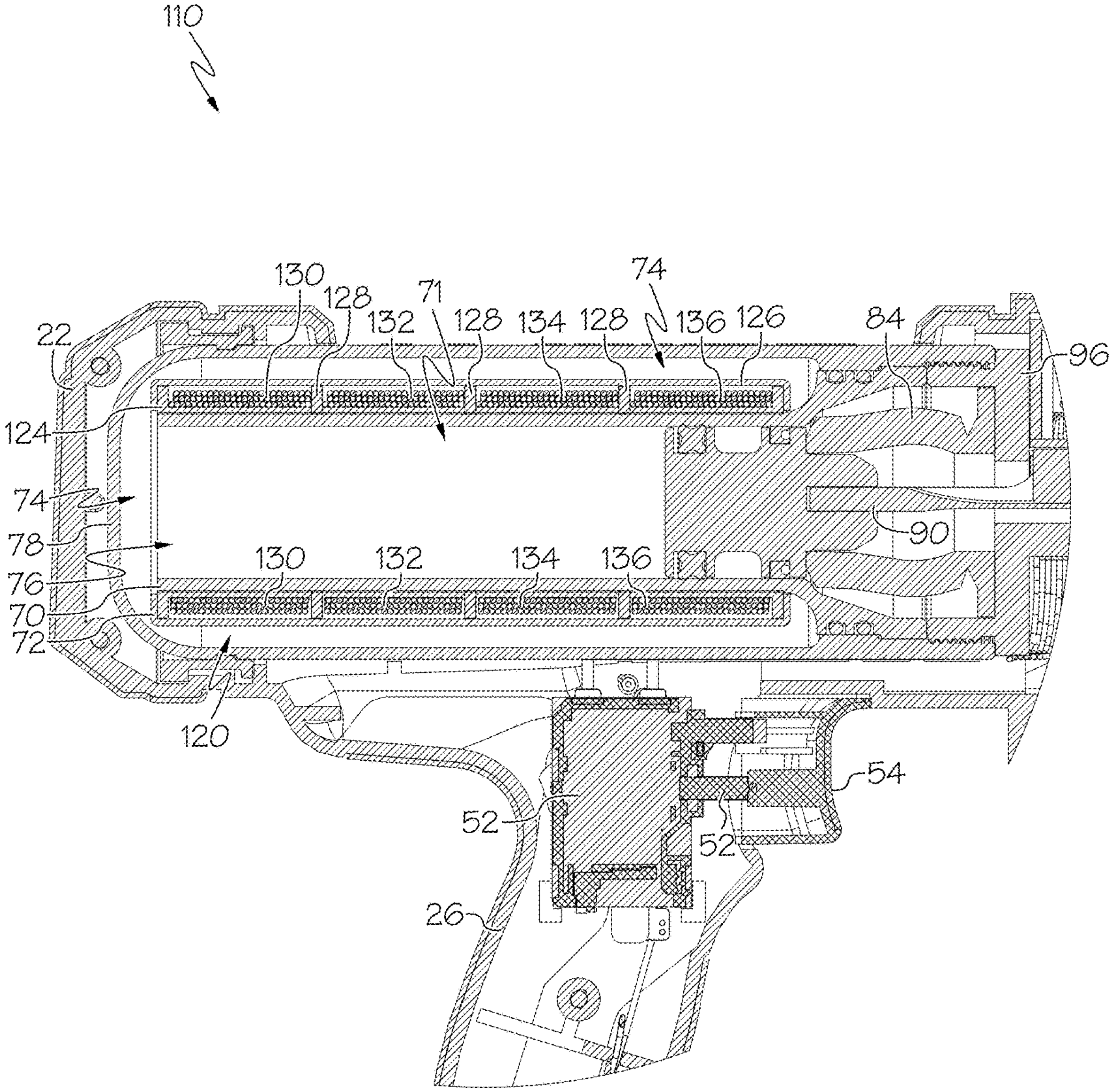
FIG. 10 is an enlarged cutaway side view showing some of the interior portions of the second embodiment fastener driving tool of FIG. 9, after the driving stroke.

As can be seen by viewing FIGS. 7 and 8, the piston/armature is near or at (proximal to) its "top" position, which is the "ready" position, where the tool is ready to undergo a driving stroke. FIGS. 9 and 10 show the same second embodiment tool 110 in an operational state where the piston/armature 80 has been driven and is now at a "driven" position, and is ready to undergo a lifting stroke. As with other Senco FUSION® tools, this driven position as illustrated in FIGS. 9 and 10 is only a temporary position; unless the tool has literally failed or has entered some type of failure mode, then during a normal driving event, the piston/armature will be automatically lifted back toward its ready position almost immediately after undergoing a driving stroke. In other words, the position illustrated in FIGS. 9 and 10 of this "driven position" is only temporary (on the order of milliseconds), and the multi-stage coil 122 will almost immediately begin to energize and force the piston/armature back from this driven position towards its ready position that is seen in FIGS. 7 and 8. (The same is true for the illustrations on FIGS. 1-4 for the first embodiment tool 10.)

The multi-stage coil of the second embodiment 110 allows the overall driving force to be intermittently applied by any one of these single coils 130, 132, 134, or 136. At the position illustrated in FIG. 10, the fourth or "lowest" coil 136 will be the first one energized by the control circuit, and after the piston/armature begins to be forced upward towards the ready position, the third coil 134 will become energized and the fourth coil 136 will become deenergized. Later in the lifting stroke the second coil 132 will become energized and the third coil 134 will become deenergized; finally, as the piston/armature nears the top position, the first coil 130 will energize, while the second coil 132 will deenergize. At that point, the coil 130 will be energized to force the piston/armature 80 toward its top or near-top travel position (also referred to as the "ready position"), and that coil will temporarily remain energized until the latch solenoid 68 energizes and forces the latch 60 to engage with one of the drive openings 92. Once that latch engagement has occurred, then the first coil 130 can deenergize, and the latch will then hold the piston/armature at the ready position until the tool is ready to be used in a future driving stroke.

Figure 17:
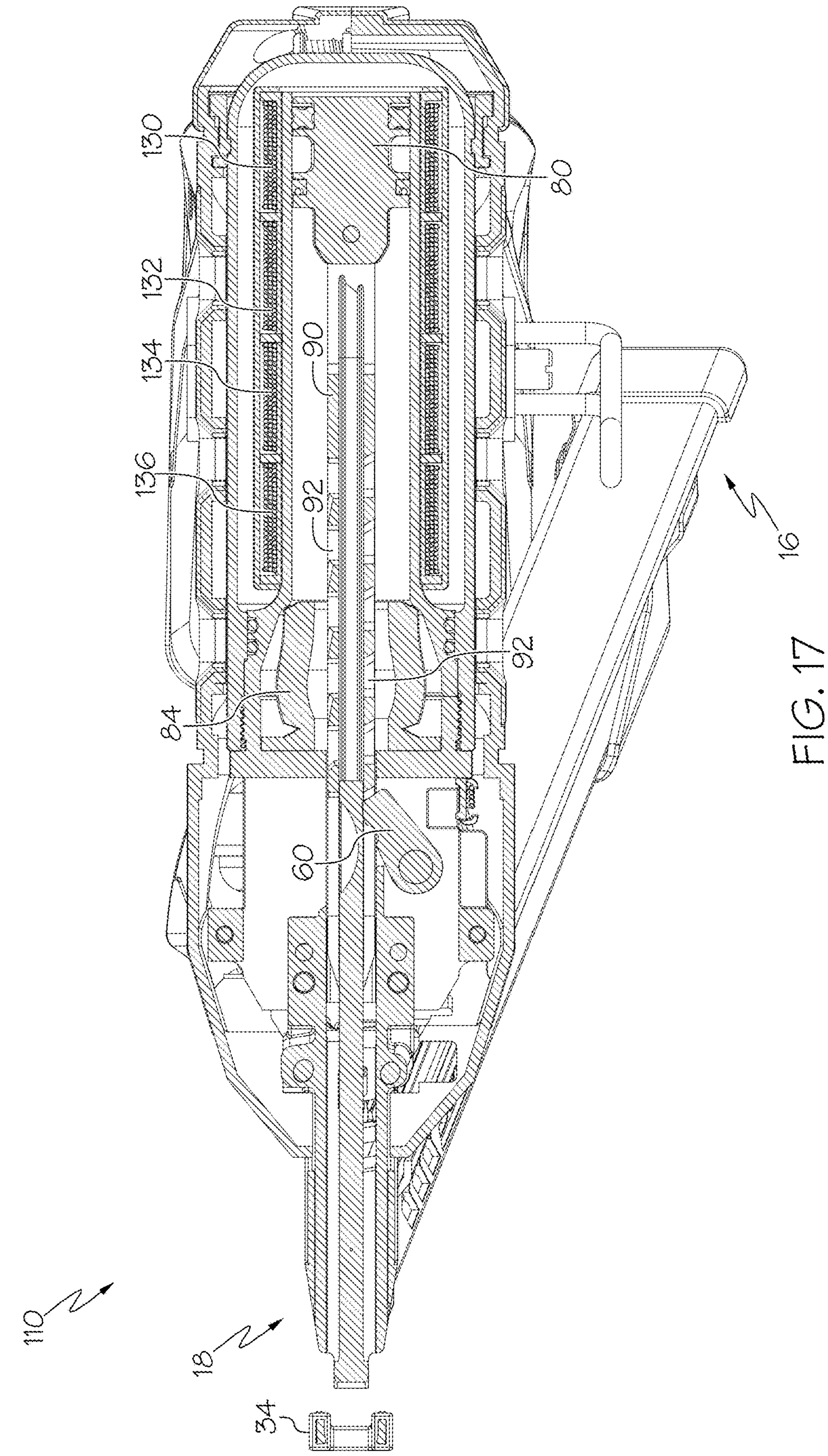
FIG. 17 is a cutaway top view showing some of the interior portions of the second embodiment fastener driving tool of FIG. 7, in which the driver/piston is located at its "ready" position, and the latch is engaged in an interfering relationship with a driver opening, thereby holding the driver/piston at the ready position.

In FIG. 17 the latch 60 is holding the driver/piston combination at its "up" or "ready" position, by engaging into one of the driver openings 92. This is the higher pressure situation for the pressurized gas system of tool 110. The latch solenoid 68 must be actuated to withdraw (by pivot action) the latch from that driver opening 92, thereby allowing the driver/piston to undergo a driving stroke due to the pressurized gas in the displacement volume 76.

Figure 18:
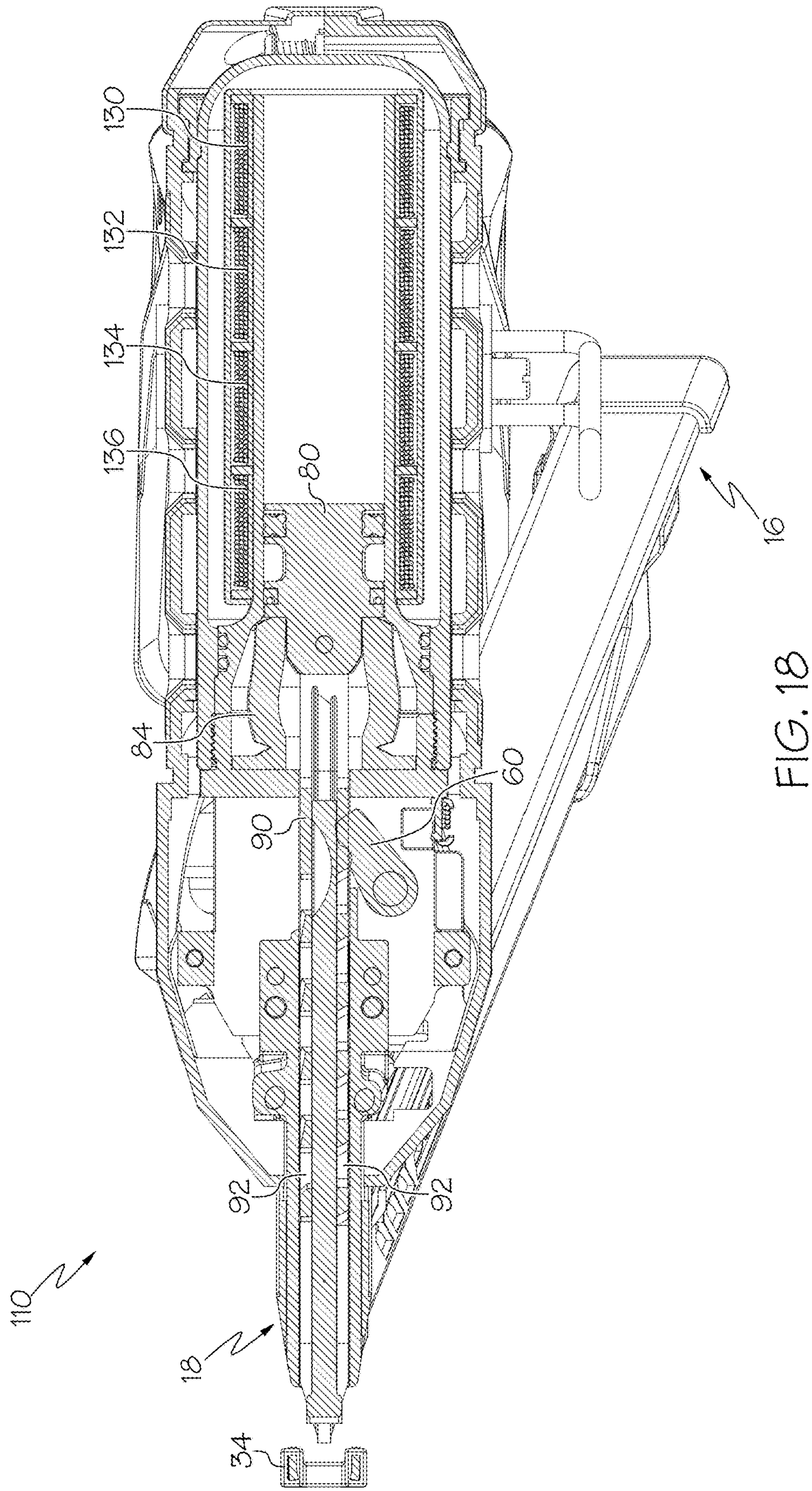
FIG. 18 is a cutaway top view showing some of the interior portions of the first embodiment fastener driving tool of FIG. 7, in which the driver/piston is located at its "driven" position, and the latch is engaged in an interfering relationship with a driver opening, thereby temporarily holding the driver/piston just before a lifting stroke begins.

In FIG. 18, the driver/piston is located at its "down" or "driven" position, and the latch 60 is momentarily engaged in an interfering relationship with a driver opening 92, thereby temporarily holding the driver/piston just before a lifting stroke begins. This is the lower pressure situation for the pressurized gas system of tool 110. If desired, the physical shape of the spring-loaded latch 60 can allow the driver to "slip" upward, without using the solenoid to withdraw the latch 60.

General Features of the Tool

The tools 10 and 110 described herein have many features in common with the FUSION product line of tools sold by Kyocera Senco Industrial Tools, Inc. For example, the driving stroke is implemented by a gas spring which comprises reusable pressurized gas that is generally stored in a main storage chamber—e.g., the chamber 74. In the illustrated embodiments, that main storage chamber substantially surrounds at least a portion of the working cylinder 71. In the FUSION product line, as here, the pressurized gas is not vented to atmosphere after it produces a driving stroke, but instead it remains in the upper part of the working cylinder (above the piston, in the displacement volume) and in the main storage chamber itself.

By providing the main storage chamber, the internal pressure of the "air spring gas" does not become too low to force the driver to effectively drive a nail into a workpiece, because the overall volume of this "air spring gas" does not proportionately expand (as the piston moves) to a point where it becomes ineffective for that purpose. In general, the main storage chamber 74 and the top portions of the hollow cylinder—at the so-called gas pressure chamber 76, which is above the piston, and is a variable volume (i.e., the "displacement volume")—are always in fluidic communication with one another. There is no intermediate valve to stop the pressurized gas in the storage volume 74 from entering the top portion of the working cylinder 71.

Since the tools 10 and 110 are designed to re-use their pressurized gas for thousands of operating cycles, they can be used repeatedly without need for an on-board gas replenishment system. (Some conventional "air tools" use "air bottles" that are attached to the nail driving tool during normal operation. Those types of air tools truly have a "gas replenishment system.")

On the other hand, even FUSION tools will eventually need a gas "re-charge" to replenish the gas that has slowly leaked from the tool after many, many operating cycles. Therefore, a gas replenishment valve could be installed on a FUSION-type tool, such as the tools 10 and 110 described herein. The provision of such an on-board valve would not be a gas replenishment "system," because one cannot merely open that valve and expect gas to flow into the main storage chamber. Instead, a source of high pressure gas (well over 150 PSI) is required to add more gas into one of these tools. That requires some special equipment, and typically the replenishment takes place at an authorized Senco dealer.

With or without a gas replenishment valve, the design of tools 10 and 110 is such that they are to be operated under normal conditions with no external gas hose and with no external power cable, similar to Senco's FUSION tools. This makes these tools truly portable, for ease of use on a jobsite. However, it will be understood that these tools 10 and 110 could be provided with an electrical power cable so as to use AC line voltage, instead of using a battery pack, if desired for certain types of jobsites. As an option, such tools could be provided with both a battery pack connection, and with an AC power cord connection, so that the user can use one type of power source for certain areas on a jobsite, but then switch to the other type of power source at other areas of the jobsite.

Electronic Controller

Figure 11:
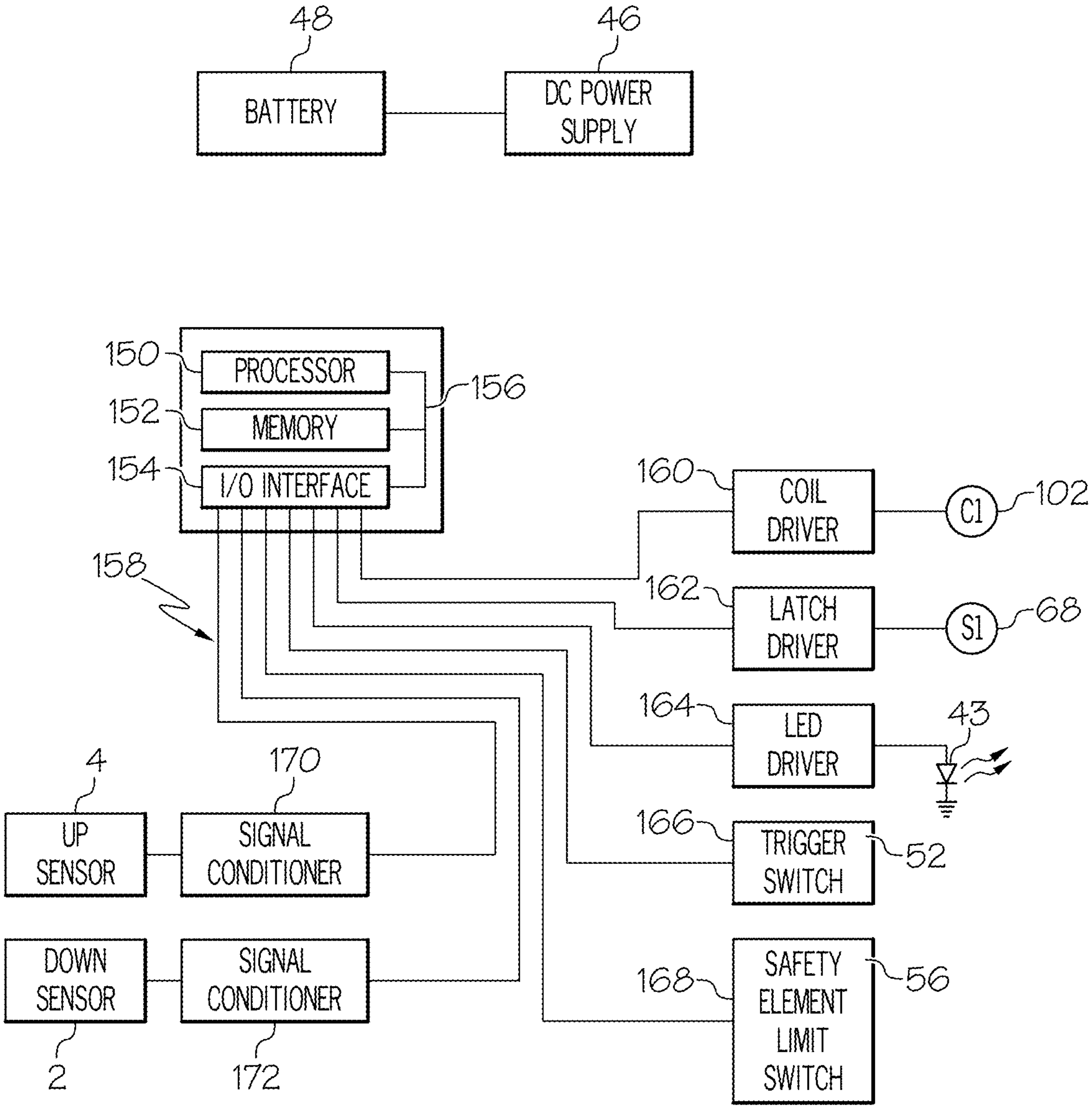
FIG. 11 is a block diagram showing some of the major electronic and electrical components for the first embodiment fastener driving tool of FIG. 1.

Referring now to FIG. 11, as noted above, the tool's system controller will typically include a microprocessor or a microcomputer integrated circuit 150 that acts as a processing circuit. Other typical circuits include at least one memory circuit 152, and an input/output interface circuit 154, and a system bus 156 to carry address lines, data lines, and various other signal lines, including interrupts. The I/O circuit 154 communicates with various external devices, including input-type devices, such as sensors and user-controlled switches, as well as output-type devices, such as an induction coil and indicator lamps. The signals between the I/O interface circuit 154 and the actual input and output devices are carried by signal pathways 158.

The LED 43 would typically have an LED driver circuit 164, which could be a dual-direction driver circuit if the LED was a bi-directional device. Such a device might be desirable, and red and green LEDs are common devices, in which current in a first direction will produce a red indicator lamp signal, while reversing the current would produce a green indicator lamp signal.

The input devices for tool 10 can include various sensors, including a trigger switch 52 and a safety contact element switch 132. If the switches 52 and 132 are standard electromechanical devices (such as limit switches), then typically no driver circuit is necessary. However, if the trigger switch and safety element switch were to be replaced by solid state sensing elements, then some type of interface circuit could be needed, and those are illustrated on FIG. 12 by the reference numerals 166 and 168, respectively.

FIG. 11 includes a coil driver circuit 160 which drives the induction coil 102, also referred to on FIG. 11 as "C1." FIG. 11 also includes a latch driver circuit 162 which drives a latch solenoid 68, also referred to on FIG. 11 as "S1." FIG. 11 also includes a battery 48, which typically will be a battery pack of multiple cells of batteries, such as Lithium-ion batteries. The battery drives a DC power supply 46, which provides the proper voltage sources for the processing circuit and other interfacing circuits, including the high-energy power required for the coil driver 160.

Figure 12:
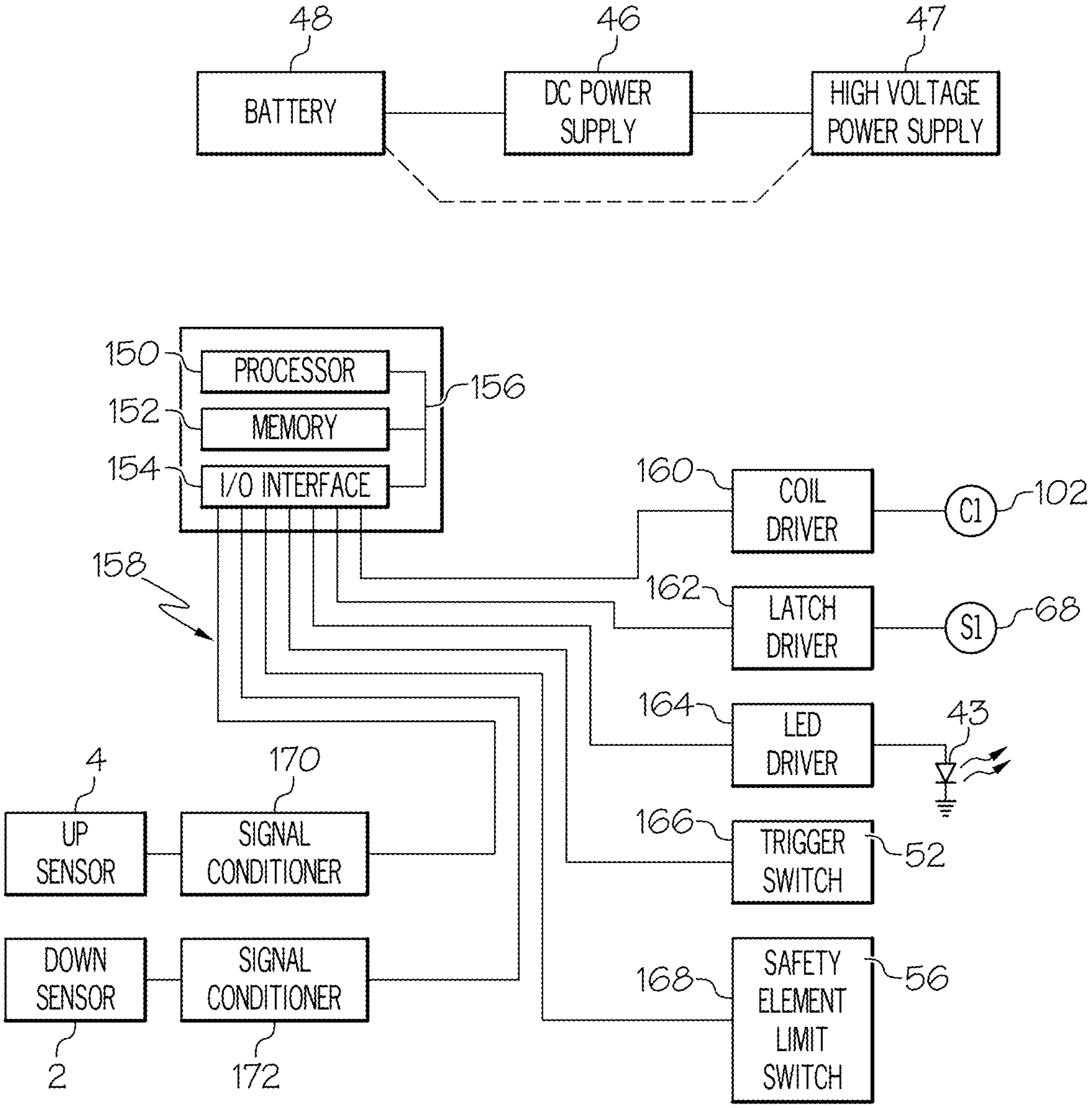
FIG. 12 is a block diagram showing some of the major electronic and electrical components for the first embodiment fastener driving tool of FIG. 1, with the addition of a high voltage power supply.

Referring now to FIG. 12, the same major electronic components are depicted here as were found on FIG. 11. The main difference is that on FIG. 12 there is an additional high voltage power supply 47 which provides a high energy output for the coil driver 160, but at a higher DC or AC voltage, for driving the induction coil 102. A typical battery pack 48 used in such power tools will provide an output voltage of about 18 volts DC. The high voltage power supply 47 can be used to provide a higher output voltage, while lowering the amount of electrical current required for supplying the coil driver circuit 160. This high voltage power supply is an optional feature of this design.

Figure 13:
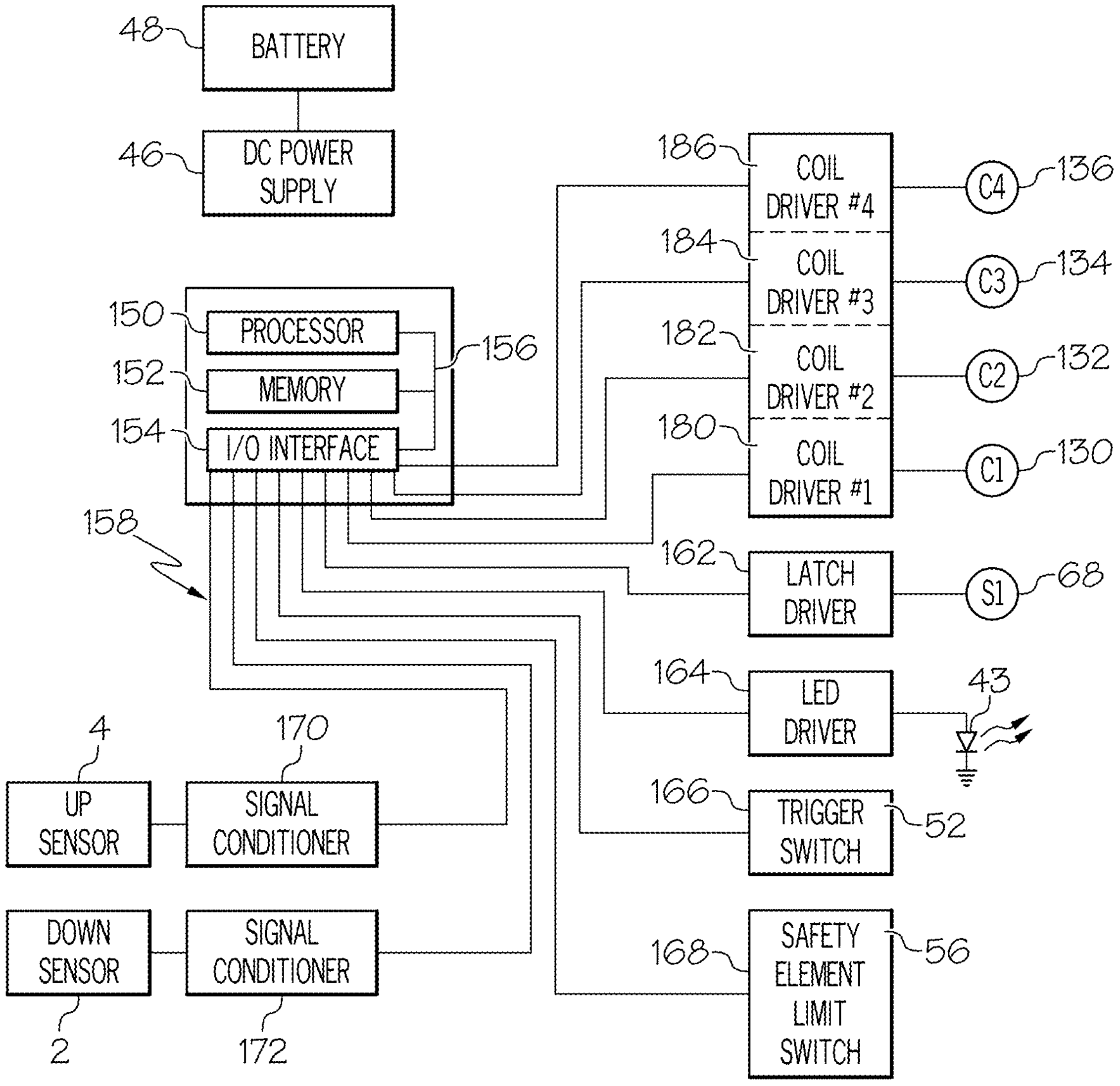
FIG. 13 is a block diagram showing some of the major electronic and electrical components for the second embodiment fastener driving tool of FIG. 7.

Referring now to FIG. 13, a block diagram drawing shows the major electrical components for the second embodiment 110 for a fastener driving tool using a multi-stage coil, such as the induction coil subassembly 120. The main difference between FIG. 13 and FIG. 11 is the fact that FIG. 13 shows four different coil driver circuits and four different induction coils. The induction coils are designated "C1," "C2," "C3," and "C4"; these are also designated by the reference numerals 130, 132, 134, and 136, as seen on FIGS. 7-10. Each of these separate induction coils requires a coil driver circuit, and on FIG. 13 these driver circuits are designated by the reference numerals 180, 182, 184, and 186, respectively. The block diagram of FIG. 13 still includes a battery pack 48 and DC power supply 46.

It will be understood that, instead of providing four separate coil driver circuits (such as circuits 180, 182, 184, 186), the second embodiment tool could be designed with a single coil driver circuit that had its output current electronically switched so as to be directed to one of the four coils in turn, as a multiplexed high-energy output. However, this would involve some design trade-offs-first: only one of the four coils could be energized at a given moment; second: that single coil driver circuit would be running at a 100% duty cycle throughout the entire lifting stroke, so its switching devices (e.g., power transistors) would endure much heating effects. (In that regard, this would be similar to the type of coil driver circuit needed by the first embodiment tool 10, which has only one induction coil 102.)

Figure 14:
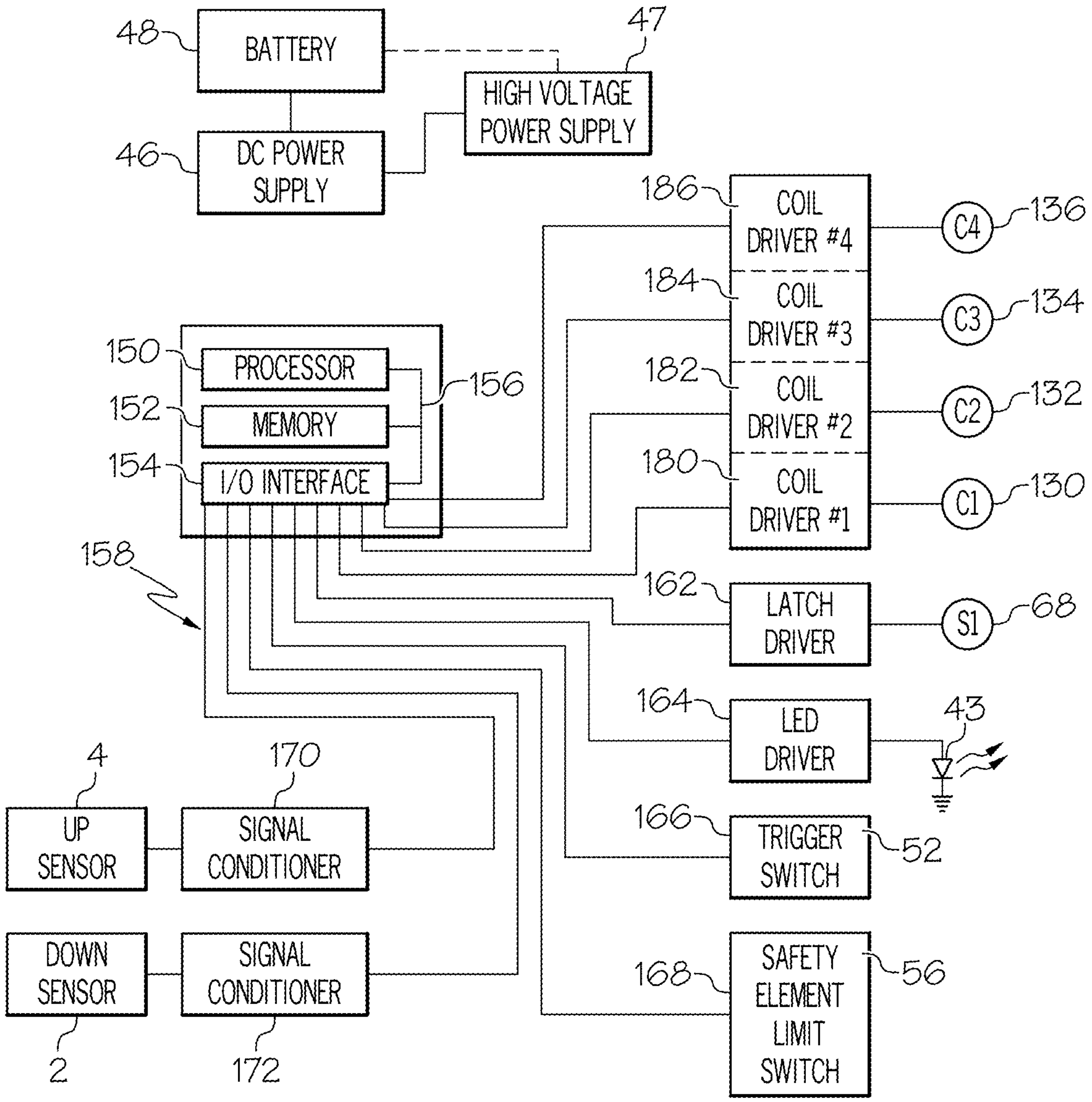
FIG. 14 is a block diagram showing some of the major electronic and electrical components for the second embodiment fastener driving tool of FIG. 7, with the addition of a high voltage power supply.

Referring now to FIG. 14, another block diagram is illustrated which is very similar to that of FIG. 13. The main difference is the use of a high voltage power supply 47, which can be used to provide a high energy voltage source that is greater than 18 volts, which is the typical battery pack voltage used in Senco power tools. The higher voltage power supply will lower the ampacity required for the coil driver circuits 180, 182, 184, and 186.

It will be understood that the electronic controller includes sufficient circuitry so as to be an intelligent device, including a processing circuit, a memory circuit that includes instructions executable by said processing circuit, and an input/output (I/O) interface circuit that sends and receives signals to sense certain input conditions of the tool, and to command certain active devices to perform their intended functions. More specifically, the electronic controller is configured to send and receive signals: (a) to determine an operating state of the latch solenoid; (b) to determine an operating state of the trigger switch and the safety contact switch; (c) to cause the piston 80 to move from its ready position to its driven position, under first predetermined conditions; and (d) to actuate the induction coil(s) to move the piston/armature 80 (and driver 90) from the driven position to the ready position, under second predetermined conditions.

The above "first predetermined conditions" include the actuation of the trigger 54 by a human user, and the actuation of a safety contact element that occurs when the human user presses the front end of the tool (at portion 18) against a target workpiece. The above "second predetermined conditions" occur when the piston has undergone a driving stroke and has arrived at its driven position-which would be at the piston stop 84. In a typical Senco FUSION tool, the electronic controller would now automatically engage the induction coil 102 to move the piston back through a lifting stroke to its ready position. These "second predetermined conditions" can also include a safety circuit to detect whether or not the driver and its piston have successfully moved back to the ready position, via use of a driver position sensor, for example.

Third Embodiment: 53-Stage Coil

Figure 21:
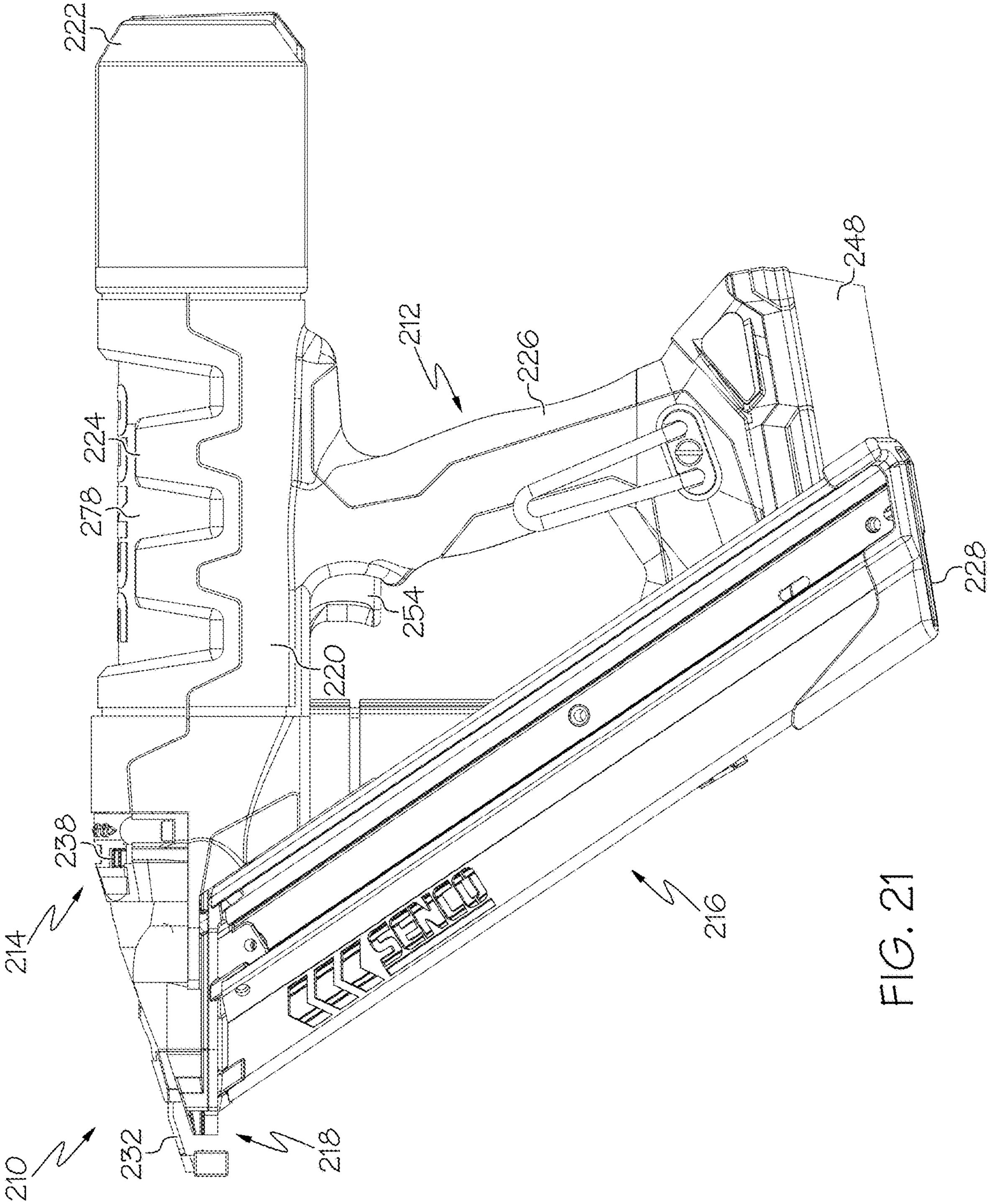
FIG. 21 is a side view of a third embodiment fastener driving tool, as constructed according to the principles of the technology disclosed herein.

Referring now to FIG. 21, a third embodiment of a fastener driving tool is generally designated by the reference numeral 210. This tool 210 is mainly designed to linearly drive fasteners such as nails and staples. Tool 210 includes a handle portion 212, a fastener driver portion 214, a fastener magazine portion 216, and a fastener exit portion 218.

A "left" outer housing portion of the driver portion is indicated at 220. A "top" outer housing portion is indicated at 222, while a "front" outer housing portion of the driver portion is indicated at 224—see FIG. 22. A "rear" outer housing portion for the handle portion is indicated at 226, while a "rear" cover of the magazine portion is indicated at 228. It will be understood that the various directional nomenclature provided above is with respect to the illustration of FIG. 21, and the third embodiment fastener driving tool 210 can be used in many other angular positions, without departing from the principles of this technology.

Figure 22:
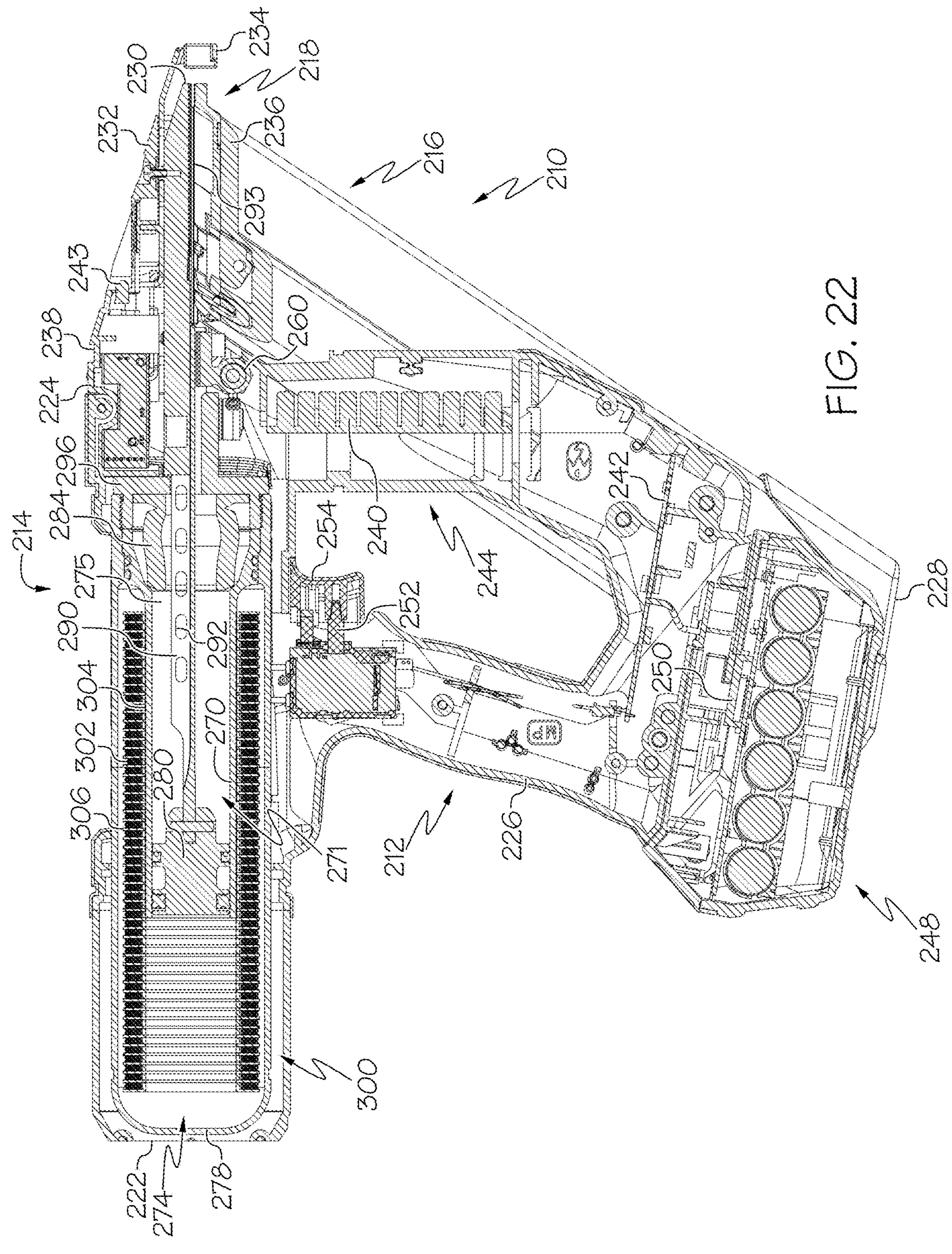
FIG. 22 is a cutaway side view showing the interior portions of the third embodiment fastener driving tool of FIG. 21, showing a piston/armature at its pre-drive stroke (or "ready") position, and including a 53-stage induction coil.

Referring now to FIG. 22, the area of the tool 210 in which a fastener is released is indicated approximately by the reference numeral 230, which is the "bottom" of the fastener exit portion of tool 210. Before the tool is actuated, a safety contact element 232 extends to or beyond the bottom 230 of the fastener exit, and this extension of the safety contact element (at the reference numeral 234) is the bottommost or "front" portion of the entire tool 210.

Other elements that are depicted in FIG. 21 or 22 include a guide body 236 and a depth of drive adjuster 238, which are in mechanical communication with the magazine portion 216. A trigger switch 252 is activated by a trigger actuator 254. The handle portion 212 is designed for gripping by a human hand, and the trigger actuator 254 is designed for linear actuation by a person's finger while gripping the handle portion 212. Trigger switch 252 provides an input signal to the tool's control system. There are also other input devices used with the system controller, such as a safety contact element switch 56 (see FIG. 11), which is activated when the front end of the tool is pressed against a workpiece, which forces the safety contact element 232 to be pushed "into" the remainder of the tool.

In the illustrated embodiment, the tool 210 includes a light emitting diode (LED) 243 in the front housing 244, which provides some status information to the user of the tool. Additionally, the tool 210 optionally can contain one or more position sensors (not seen in FIG. 22) inside the guide body 236, which can provide certain information about the movements of the driver "blade" 290.

The fastener driving tool 210 also includes a 53-stage electromagnetic induction coil subassembly, generally designated by the reference numeral 300. The subassembly 300 also includes a plurality of bobbins 304, and a plurality of yokes 306. The individual coil windings themselves are designated at reference numeral 302, which correspond to fifty-three (53) separate induction coils. Each of these induction coils is a separate electrical inductor comprising a single multi-turn winding (i.e., they are electrically separate windings), and each coil is designed to impart a magnetic force on the piston/armature 280 at the appropriate time during a lifting stroke.

In general, during a lifting stroke the individual coils are to be energized in a predetermined moving sequence, or groups of coils are to be energized in a predetermined moving sequence, as the piston is progressively being lifted. In other words, at least one of the individual coils is to be energized in a predetermined moving sequence. For example, the individual induction coils could be numbered 1 through 53, starting with coil #1 being 'nearest' to the piston stop, and therefore, nearest to the movable piston just after a driving stroke has occurred. So, in this example, the 'nearest' five of the induction coils (i.e., coils numbered 1 through 5, inclusive) could be energized at a "Sequence Step #1" to quickly get the piston moving for a lifting stroke. Then, at the appropriate time interval, a "Sequence Step #2" could occur, in which coils numbered 2 through 6, inclusive, could be energized. Or, alternatively, and depending upon the exact design of the overall electromagnetic induction coil subassembly 300, rather than coils #2 through #6 being energized at "Sequence Step #2," the electronic controller could instead energize coils #6 through #10 or perhaps coils #8 through #12, for Sequence Step #2. Or, in a yet further alternative design, the number of coils being energized in each so-called "Sequence Step" could vary, such that either fewer or greater numbers of individual coils are energized for some of the individual Sequence Steps. It must be remembered that, as the piston is lifted farther away from the piston stop, the effective gas pressure on the 'high pressure side' of the piston will increase, and therefore, greater numbers of the individual coils may be required for the Sequence Steps as the piston approaches the 'top' of its lifting stroke.

The bobbins 304 and yokes 306 are essentially the same parts that were described above in reference to FIGS. 1-4. Again, the bobbins will typically be made of a material that is non-conductive and non-magnetic, and the yokes will typically be made of a magnetic material (having a high magnetic permeability).

In the illustrated embodiment, the bobbins 304 and coils 302 both fit around the outer circumference (or perimeter) of the working cylinder 271; however, it is not required that the entire coil go around the cylinder wall 270, although the induction coils 302 should be wound at least partially around the cylinder, to make a physically smaller device. This type of coil will typically comprise a winding with multiple turns, with many—if not most—of those turns being wound around the cylinder wall 270.

A battery pack 248 is attached near the rear of the handle portion 212, and this battery provides electrical power for the induction coil subassembly 300 as well as for a control system. In the illustrated embodiment of FIG. 22, the battery pack 248 is attached to the very back portion of the handle, just behind the printed circuit board 242 in this illustrated embodiment.

The fastener driving tool 210 disclosed herein uses an induction coil subassembly to "lift" the piston and driver from a lower position, which is also sometimes referred to as its "driven" position, toward an upper position, which is also sometimes referred to as its "ready" position. The FUSION® nail driving tools that have been sold by Kyocera Senco Industrial Tools, Inc. in the past have used a mechanical "lifter" for this function. In those earlier FUSION® tools, the "front housing" 244 as seen on FIG. 22 was usually referred to as a "motor housing," because that is where the lifter's motor was positioned within the tool housing. In the present embodiment of the fastener driving tool 210, that front housing 244 now contains a printed circuit board 240 with many high-power electronic components, used for providing energy to the induction coils 302. In this design, there will also be other printed circuit boards, at 242 and at 250, for example, which will contain other electronic components also used for controlling the tool 210. Some of these printed circuit boards will also contain more high-energy electronic components, such as switching transducers and storage capacitors, for driving the induction coils 302 with a sufficient energy to perform the lifting function. The circuit board 250 is located inside the battery pack 248, and controls the use of the battery cells.

The piston 280 will also act as an armature, because it is not only acted on by pressurized gas from the main storage chamber 274, but it is also acted on magnetically by the induction coils 302. In other words, when the induction coils 302 are energized, they will generate a magnetic field that tends to "lift" the piston/armature toward the ready position. Consequently, the piston/armature 280 needs to be essentially air-tight around its outer perimeter that fits inside the interior sleeve or cylinder wall 270, and it also needs to be at least partially constructed of a magnetic material, such as soft-steel or a soft-iron alloy, so that the magnetic field produced by the induction coils 302 will act on it to force it back "upward" toward the ready position, much as a coil operates on a plunger of a solenoid.

As noted above, the tool 210 includes at least one printed circuit board that contains a system controller, and also carries other electrical and electronic components necessary for proper functioning of the tool. These printed circuit boards 240 and 242 could be positioned almost anywhere inside the "empty" spaces of the housing, including inside the front housing 244 and the bottom portion of the tool, just above the battery pack 248. Another optional feature of this tool would be to include some vents in the housing somewhat near the battery pack, such as in the handle portion 212. These vents could allow some forced cooling air to flow around the printed circuit boards, to help carry away the heat produced by the electronic components, especially those components that provide electrical energy for the induction coils 302. The forced cooling air would be produced each time the piston 280 moved though its travel during a driving stroke and during a lifting (or "return") stroke. Details of this type of cooling air system are provided in another patent application by Kyocera Senco Industrial Tools, Inc., in published patent application No. US 2019/0321955 A1, filed on Aug. 28, 2018, and titled, "FORCED AIR COOLING FROM PISTON MOVEMENTS OF NAILER TOOL."

A latch 260 presses against the driver 290 under certain conditions. Latch 260 has an engagement extension that presses directly against one of the surfaces of the driver 290, so that when an opening 292 in the driver is encountered by the latch 260, the latch will (via spring force) be forced into that opening. If that occurs, the driver will be allowed to travel "downward" (in the direction of a driving stroke) only to the point where the latch contacts the "end" of the opening 292.

A working cylinder subassembly is designated by the reference numeral 271, and this is included as part of the fastener driver portion 214. As viewed on FIG. 22, the working cylinder 271 includes a cylinder wall 270, and within this cylinder wall 270 is a movable piston 280, and a stationary piston stop 284. Partially surrounding, in the illustrated embodiment, the cylinder wall 270 is a main storage chamber 274 (also sometimes referred to herein as a "pressure vessel storage space") and an outer pressure vessel wall 278. The top-most portion of the working cylinder is indicated at 272, as seen on FIG. 22, for example, of the fastener driver portion 214.

Also within the fastener driver portion 214 are mechanisms that will actually drive a fastener into a solid object. This includes the driver 290, a cylinder "venting chamber" 275 (which would typically always be at atmospheric pressure), the driver track 293, and the latch 260. Note that the driver track 293 also operates as a fastener track, in that the lower portion of the overall passageway through the guide body that guides the driver also guides the fastener. More specifically, the passageway through the guide body is designed to receive a fastener (such as a nail) from the magazine 216 at a "receiving end" of that portion of the overall track 293, and then the driver 290 pushes that fastener through the lower portion of the overall track (or passageway) 293 until the fastener reaches an "exit end" at reference numeral 230, at which time that fastener will be driven into the target workpiece. In a typical nailer tool, the magazine will hold a large number of nails, and feeds only a single nail to the fastener track for a given driving stroke; this occurs automatically, without any further action by the human user (except to operate the trigger and push the front end of the tool against a workpiece), once the magazine 216 has been mounted onto the tool 210.

Driver 290 is rather elongated; the main body of its elongated face is substantially rectangular. There are multiple openings 292 that are positioned along the longitudinal surfaces of the driver. In the illustrated embodiment, these openings extend in a parallel direction to the longitudinal centerline of driver 290, and they are spaced-apart from one another along the longitudinal surface of the driver 290. It will be understood that the precise positions for the openings 292 could be different from those illustrated for the driver 290 without departing from the principles of the technology disclosed herein.

The latch 260 is designed to "catch" the driver 290 at times when the driver should not be allowed to move through an entire "driving stroke." The latch has a catching portion that can engage with an opening 292 of the driver 290, when the latch is moved to its engaged, or "interfering" position. When a driving stroke is to occur, the latch is pivoted so that its catching surface is moved to its "disengaged" position, which is out of the way of the driver, and thus its catching surface will not interfere with any of the driver's openings 292. An exemplary embodiment of a similar latch that engages with driver protrusions (rather than driver openings) is fully described in U.S. Pat. No. 8,011,441, owned by Senco Brands, Inc., which is incorporated herein by reference in its entirety.

There is a cylinder base 296 that mainly separates the gas pressure portions of the fastener driver portion 214 from the lower mechanical portions of that driver portion 214. The portion of the variable volume that is below the piston 280 is also referred to as a cylinder venting chamber 275, which is vented to atmosphere. In one form of an exemplary embodiment, a vent (not shown) near the cylinder base 296 is used for venting to atmosphere. In an alternative form of an exemplary embodiment, one or more vents (not shown) are placed in the handle portion 212, so as to force cooling air past the printed circuit boards, as discussed above.

Figure 23:
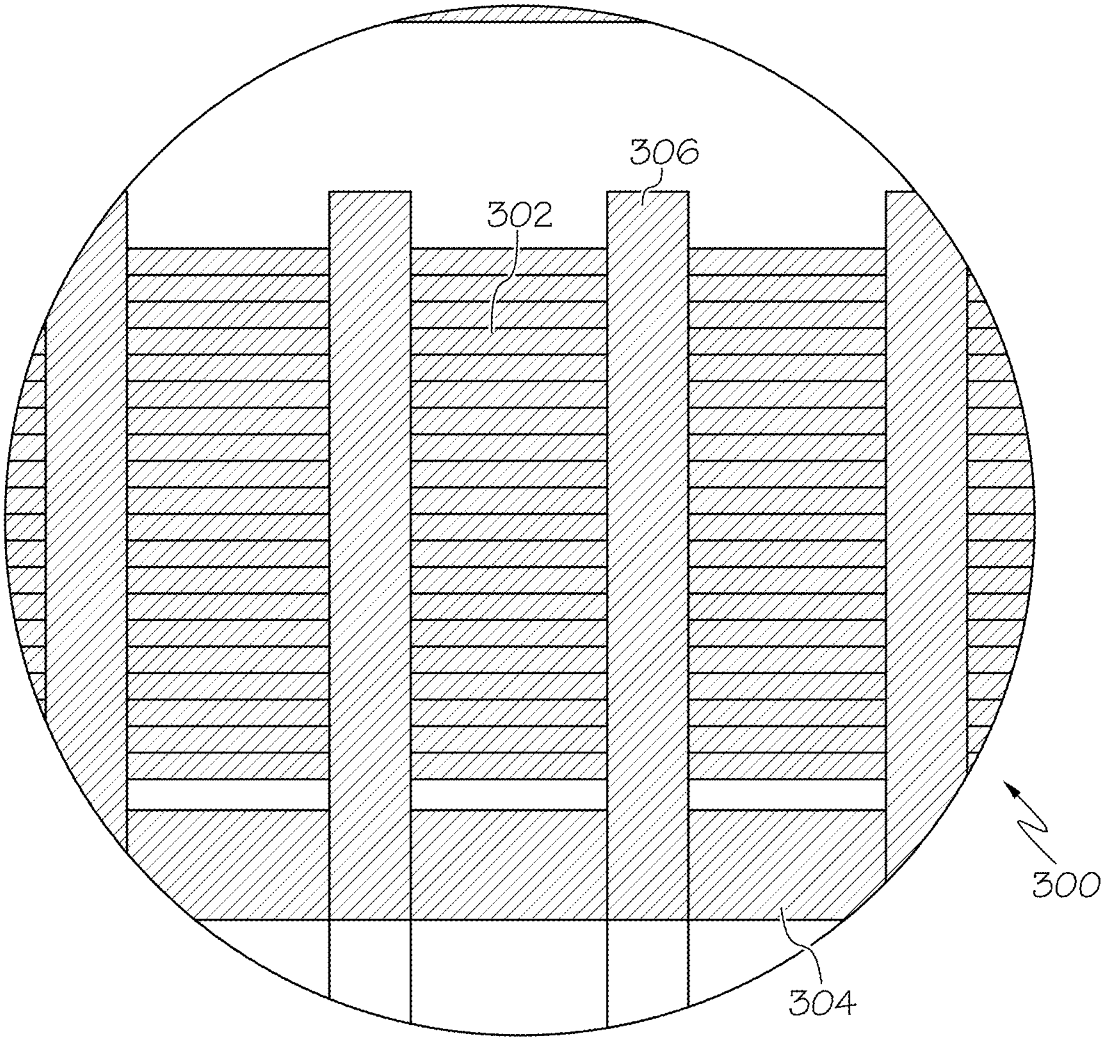
FIG. 23 is a magnified side view of a portion of the 53-stage induction coil used in the third embodiment fastener driving tool of FIG. 21.

Referring now to FIG. 23, a portion of the induction coil S/A 300 is illustrated in close detail. Several of the induction coils 302 are shown, each having a plurality of windings between the yokes 306 and the bobbins 304.

As can be seen from viewing FIG. 22, the coil subassembly 300 extends well past the end of the maximum piston travel, along the centerline of the pressure chamber. The individual coil stages that are to the left (in this view) of the "ready" position of the piston 280 (as depicted in this view of FIG. 22) are the ones that are energized as the piston is being "lifted" during the final stages of a return stroke, and they exert a very strong "pulling" force on the piston, in essence, pulling the piston farther and farther to the left until it reaches that ready position.

Once the piston 280 arrives at the appropriate ready position, the latch 260 can be engaged to hold the piston at that ready position without further assistance from the induction coil subassembly, and the induction coil can then be de-energized. This physical configuration of the multiple coil stages for this third embodiment is more preferred than the configurations illustrated for the first two embodiments, as described above in reference to FIGS. 1-20.

Fourth Embodiment: With Power Cord

Figure 24:
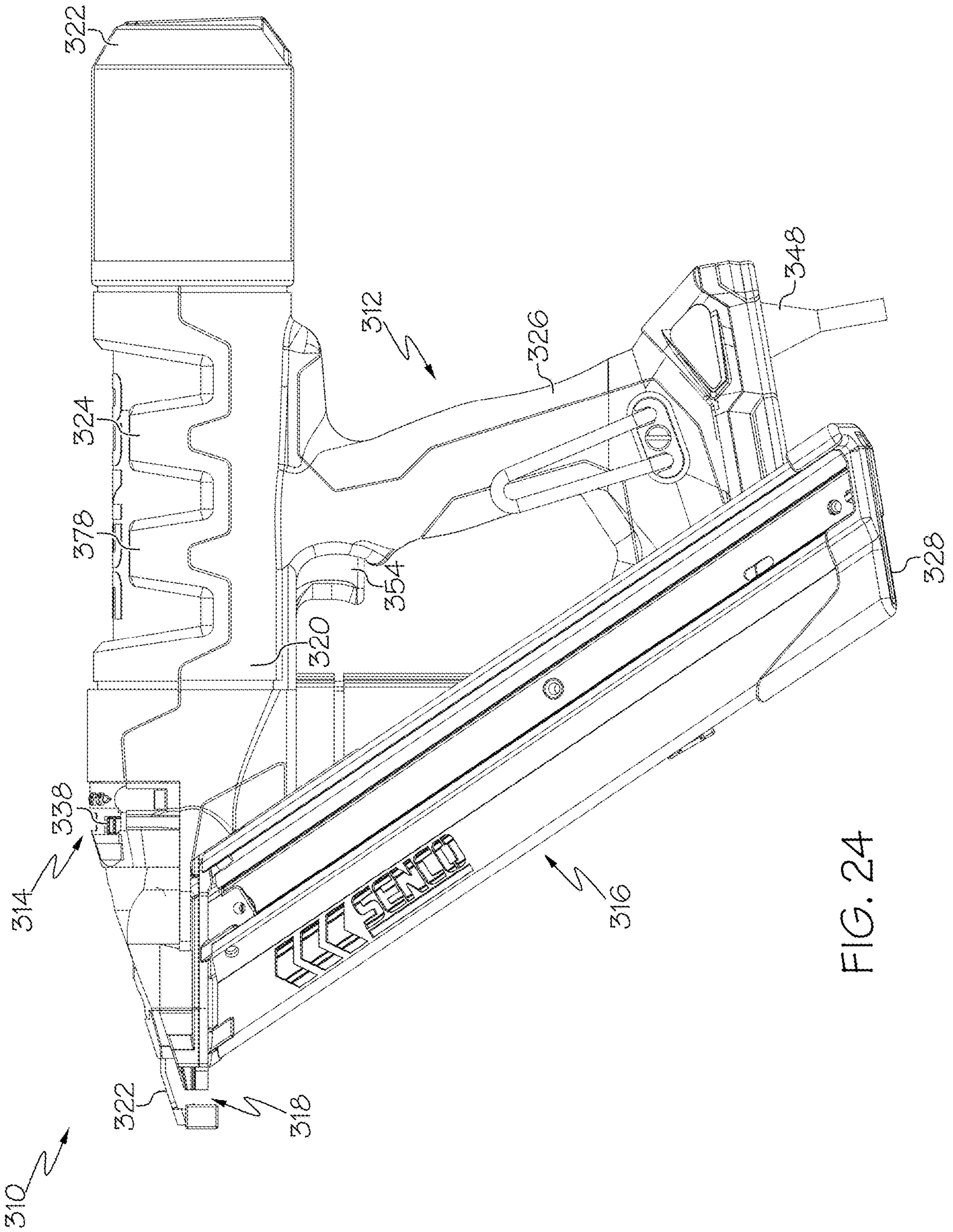
FIG. 24 is a side view of a fourth embodiment fastener driving tool, as constructed according to the principles of the technology disclosed herein, having a power cord.

Referring now to FIG. 24, a fourth embodiment of a fastener driving tool is generally designated by the reference numeral 310. This tool 310 is mainly designed to linearly drive fasteners such as nails and staples. Tool 310 includes a handle portion 312, a fastener driver portion 314, a fastener magazine portion 316, and a fastener exit portion 318.

A "left" outer housing portion of the driver portion is indicated at 320. A "top" outer housing portion is indicated at 322, while a "front" outer housing portion of the driver portion is indicated at 324—see FIG. 25. A "rear" outer housing portion for the handle portion is indicated at 326, while a "rear" cover of the magazine portion is indicated at 328. It will be understood that the various directional nomenclature provided above is with respect to the illustration of FIG. 24, and the fourth embodiment fastener driving tool 310 can be used in many other angular positions, without departing from the principles of this technology.

Figure 25:
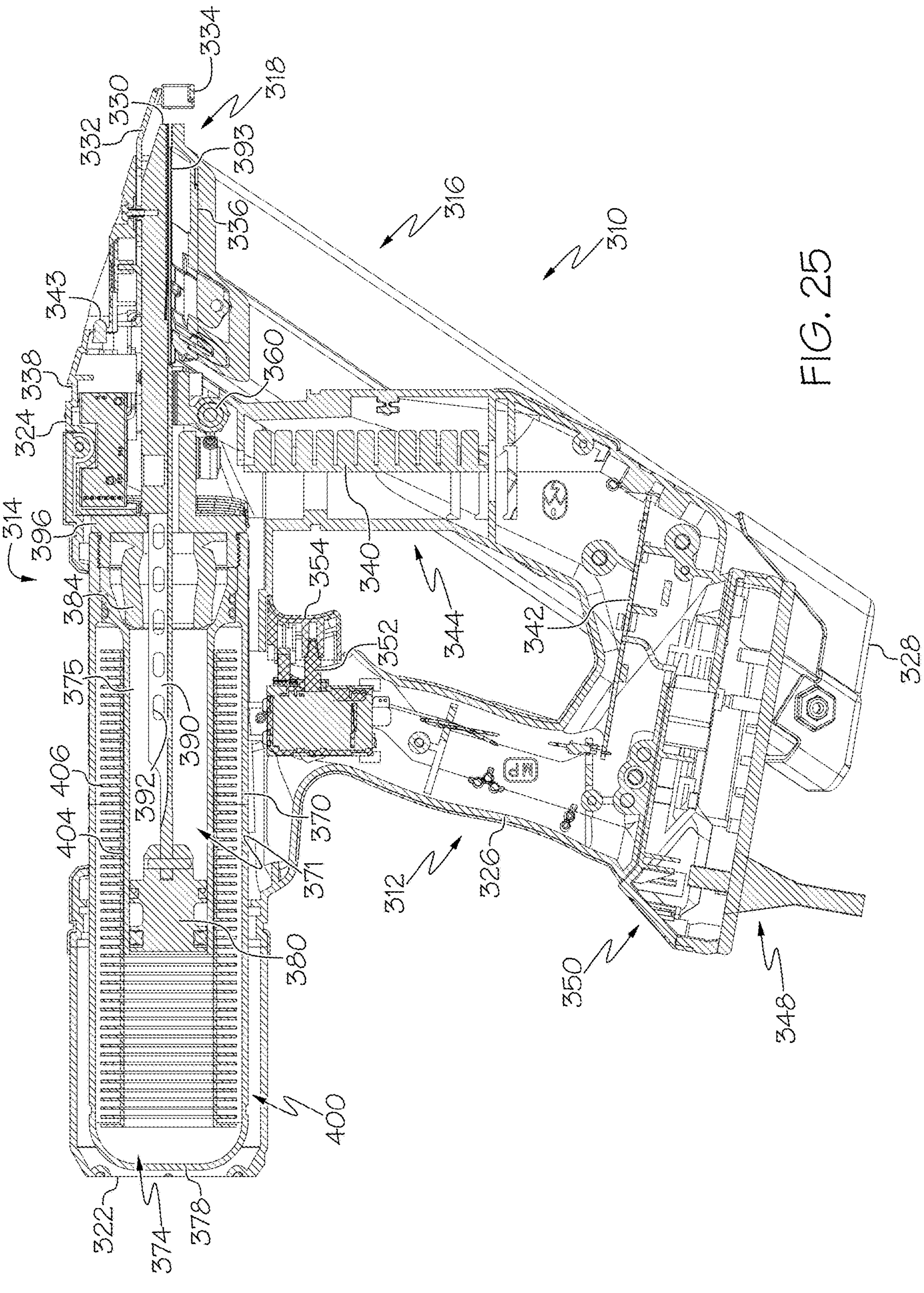
FIG. 25 is a cutaway side view showing the interior portions of the fourth embodiment fastener driving tool of FIG. 24, showing a piston/armature at its pre-drive stroke (or "ready") position, and using a power cord with an AC/DC power converter.

Referring now to FIG. 25, the area of the tool 310 in which a fastener is released is indicated approximately by the reference numeral 330, which is the "bottom" of the fastener exit portion of tool 310. Before the tool is actuated, a safety contact element 332 extends to or beyond the bottom 330 of the fastener exit, and this extension of the safety contact element (at the reference numeral 334) is the bottommost or "front" portion of the entire tool 310.

Other elements that are depicted in FIG. 24 or 25 include a guide body 336 and a depth of drive adjuster 338, which are in mechanical communication with the magazine portion 316. A trigger switch 352 is activated by a trigger actuator 354. The handle portion 312 is designed for gripping by a human hand, and the trigger actuator 354 is designed for linear actuation by a person's finger while gripping the handle portion 312. Trigger switch 352 provides an input signal to the tool's control system. There are also other input devices used with the system controller, such as a safety contact element switch 56 (see FIG. 11), which is activated when the front end of the tool is pressed against a workpiece, which forces the safety contact element 332 to be pushed "into" the remainder of the tool.

In the illustrated embodiment, the tool 310 includes a light emitting diode (LED) 343 in the front housing 344, which provides some status information to the user of the tool. Additionally, the tool 310 optionally can contain one or more position sensors (not seen in FIG. 25) inside the guide body 336, which can provide certain information about the movements of the driver "blade" 390.

The fastener driving tool 310 also includes a 53-stage electromagnetic induction coil subassembly, generally designated by the reference numeral 400. The subassembly 400 also includes a plurality of bobbins 404, and a plurality of yokes 406. The individual coil windings themselves are not shown in FIG. 25 (see FIG. 22—induction coils 302). Each of these induction coils (not shown in FIG. 25) is a separate electrical inductor comprising a single multi-turn winding (i.e., they are electrically separate windings), and each coil is designed to impart a magnetic force on the piston/armature 380 at the appropriate time during a lifting stroke. As noted above, individual or groups of these coils are to be energized in a predetermined moving sequence. The bobbins 404 and yokes 406 are essentially the same parts that were described above in reference to FIGS. 1-4. Again, the bobbins will typically be made of a material that is non-conductive and non-magnetic, and the yokes will typically be made of a magnetic material (having a high magnetic permeability).

In the illustrated embodiment, the bobbins 404 and coils (not shown in FIG. 25) both fit around the outer circumference (or perimeter) of the working cylinder 371; however, it is not required that the entire coil go around the cylinder wall 370, although the induction coils should be wound at least partially around the cylinder, to make a physically smaller device. This type of coil will typically comprise a winding with multiple turns, with many—if not most—of those turns being wound around the cylinder wall 370.

A power cord 348 is attached near the rear of the handle portion 312, and this battery provides electrical power for the induction coil subassembly 300 as well as for a control system. In the illustrated embodiment of FIG. 25, the power cord 348 is attached to the very back portion of the handle, just behind the printed circuit board 342 in this illustrated embodiment.

The fastener driving tool 310 disclosed herein uses an induction coil subassembly to "lift" the piston and driver from a lower position, which is also sometimes referred to as its "driven" position, toward an upper position, which is also sometimes referred to as its "ready" position. The FUSION® nail driving tools that have been sold by Kyocera Senco Industrial Tools, Inc. in the past have used a mechanical "lifter" for this function. In those earlier FUSION® tools, the "front housing" 344 as seen on FIG. 25 was usually referred to as a "motor housing," because that is where the lifter's motor was positioned within the tool housing. In the present embodiment of the fastener driving tool 310, that front housing 344 now contains a printed circuit board 340 with many high-power electronic components, used for providing energy to the induction coils. In this design, there will also be other printed circuit boards, at 342, for example, which will contain other electronic components also used for controlling the tool 310. Some of these printed circuit boards will also contain more high-energy electronic components, such as switching transducers and storage capacitors, for driving the induction coils with a sufficient energy to perform the lifting function. An AC/DC power converter 350 is interfaced with the power cord 348, and converts the incoming AC power running through the power cord 348 into DC power and/or a different AC voltage for use by the tool 310.

The piston 380 will also act as an armature, because it is not only acted on by pressurized gas from the main storage chamber 374, but it is also acted on magnetically by the induction coils. In other words, when the induction coils are energized, they will generate a magnetic field that tends to "lift" the piston/armature toward the ready position. Consequently, the piston/armature 380 needs to be essentially air-tight around its outer perimeter that fits inside the interior sleeve or cylinder wall 370, and it also needs to be at least partially constructed of a magnetic material, such as soft-steel or a soft-iron alloy, so that the magnetic field produced by the induction coils will act on it to force it back "upward" toward the ready position, much as a coil operates on a plunger of a solenoid.

As noted above, the tool 310 includes at least one printed circuit board that contains a system controller, and also carries other electrical and electronic components necessary for proper functioning of the tool. These printed circuit boards 340 and 342 could be positioned almost anywhere inside the "empty" spaces of the housing, including inside the front housing 344 and the bottom portion of the tool, just above the power cord 348. Another optional feature of this tool would be to include some vents in the housing somewhat near the battery pack, such as in the handle portion 312. These vents could allow some forced cooling air to flow around the printed circuit boards, to help carry away the heat produced by the electronic components, especially those components that provide electrical energy for the induction coils. The forced cooling air would be produced each time the piston 380 moved through its travel during a driving stroke and during a lifting (or "return") stroke. As noted above, details of this type of cooling air system are provided in another patent application by Kyocera Senco Industrial Tools, Inc., in published patent application No. US 2019/0321955 A1, filed on Aug. 28, 2018, and titled, "FORCED AIR COOLING FROM PISTON MOVEMENTS OF NAILER TOOL."

A latch 360 presses against the driver 390 under certain conditions. Latch 360 has an engagement extension that presses directly against one of the surfaces of the driver 390, so that when an opening 392 in the driver is encountered by the latch 360, the latch will (via spring force) be forced into that opening. If that occurs, the driver will be allowed to travel "downward" (in the direction of a driving stroke) only to the point where the latch contacts the "end" of the opening 392.

A working cylinder subassembly is designated by the reference numeral 371, and this is included as part of the fastener driver portion 314. As viewed on FIG. 25, the working cylinder 371 includes a cylinder wall 370, and within this cylinder wall 370 is a movable piston 380, and a stationary piston stop 384. Partially surrounding, in the illustrated embodiment, the cylinder wall 370 is a main storage chamber 374 (also sometimes referred to herein as a "pressure vessel storage space") and an outer pressure vessel wall 378. The top-most portion of the working cylinder is indicated at 372, as seen on FIG. 25, for example, of the fastener driver portion 314.

Also within the fastener driver portion 314 are mechanisms that will actually drive a fastener into a solid object. This includes the driver 390, a cylinder "venting chamber" 375 (which would typically always be at atmospheric pressure), the driver track 393, and the latch 360. Note that the driver track 393 also operates as a fastener track, in that the lower portion of the overall passageway through the guide body that guides the driver also guides the fastener. More specifically, the passageway through the guide body is designed to receive a fastener (such as a nail) from the magazine 316 at a "receiving end" of that portion of the overall track 393, and then the driver 390 pushes that fastener through the lower portion of the overall track (or passageway) 393 until the fastener reaches an "exit end" at reference numeral 330, at which time that fastener will be driven into the target workpiece. In a typical nailer tool, the magazine will hold a large number of nails, and feeds only a single nail to the fastener track for a given driving stroke; this occurs automatically, without any further action by the human user (except to operate the trigger and push the front end of the tool against a workpiece), once the magazine 316 has been mounted onto the tool 310.

Driver 390 is rather elongated; the main body of its elongated face is substantially rectangular. There are multiple openings 392 that are positioned along the longitudinal surfaces of the driver. In the illustrated embodiment, these openings extend in a parallel direction to the longitudinal centerline of driver 390, and they are spaced-apart from one another along the longitudinal surface of the driver 390. It will be understood that the precise positions for the openings 392 could be different from those illustrated for the driver 390 without departing from the principles of the technology disclosed herein.

The latch 360 is designed to "catch" the driver 390 at times when the driver should not be allowed to move through an entire "driving stroke." The latch has a catching portion that can engage with an opening 392 of the driver 390, when the latch is moved to its engaged, or "interfering" position. When a driving stroke is to occur, the latch is pivoted so that its catching surface is moved to its "disengaged" position, which is out of the way of the driver, and thus its catching surface will not interfere with any of the driver's openings 392. An exemplary embodiment of a similar latch that engages with driver protrusions (rather than driver openings) is fully described in U.S. Pat. No. 8,011,441, owned by Senco Brands, Inc., which is incorporated herein by reference in its entirety.

There is a cylinder base 396 that mainly separates the gas pressure portions of the fastener driver portion 314 from the lower mechanical portions of that driver portion 314. The portion of the variable volume that is below the piston 380 is also referred to as a cylinder venting chamber 375, which is vented to atmosphere. In one form of an exemplary embodiment, a vent (not shown) near the cylinder base 396 is used for venting to atmosphere. In an alternative form of an exemplary embodiment, one or more vents (not shown) are placed in the handle portion 312, so as to force cooling air past the printed circuit boards, as discussed above.

As can be seen from viewing FIG. 25, the coil subassembly 400 extends well past the end of the maximum piston travel, along the centerline of the pressure chamber. The individual coil stages that are to the left (in this view) of the "ready" position of the piston 380 (as depicted in this view of FIG. 25) are the ones that are energized as the piston is being "lifted" during the final stages of a return stroke, and they exert a very strong "pulling" force on the piston, in essence, pulling the piston farther and farther to the left until it reaches that ready position.

Once the piston 380 arrives at the appropriate ready position, the latch 360 can be engaged to hold the piston at that ready position without further assistance from the induction coil subassembly, and the induction coil can then be de-energized. This physical configuration of the multiple coil stages for this fourth embodiment 310 is more preferred than the configurations illustrated for the first two embodiments, as described above in reference to FIGS. 1-20. Furthermore, the power requirements of the multiple induction coil stages are rather significant, and the use of AC line voltage via a power cord 348 is probably more realistic than the use of a battery pack, such as described above in reference to the third embodiment 210.

Graph: Active Coils Needed for Lift

Figure 26:
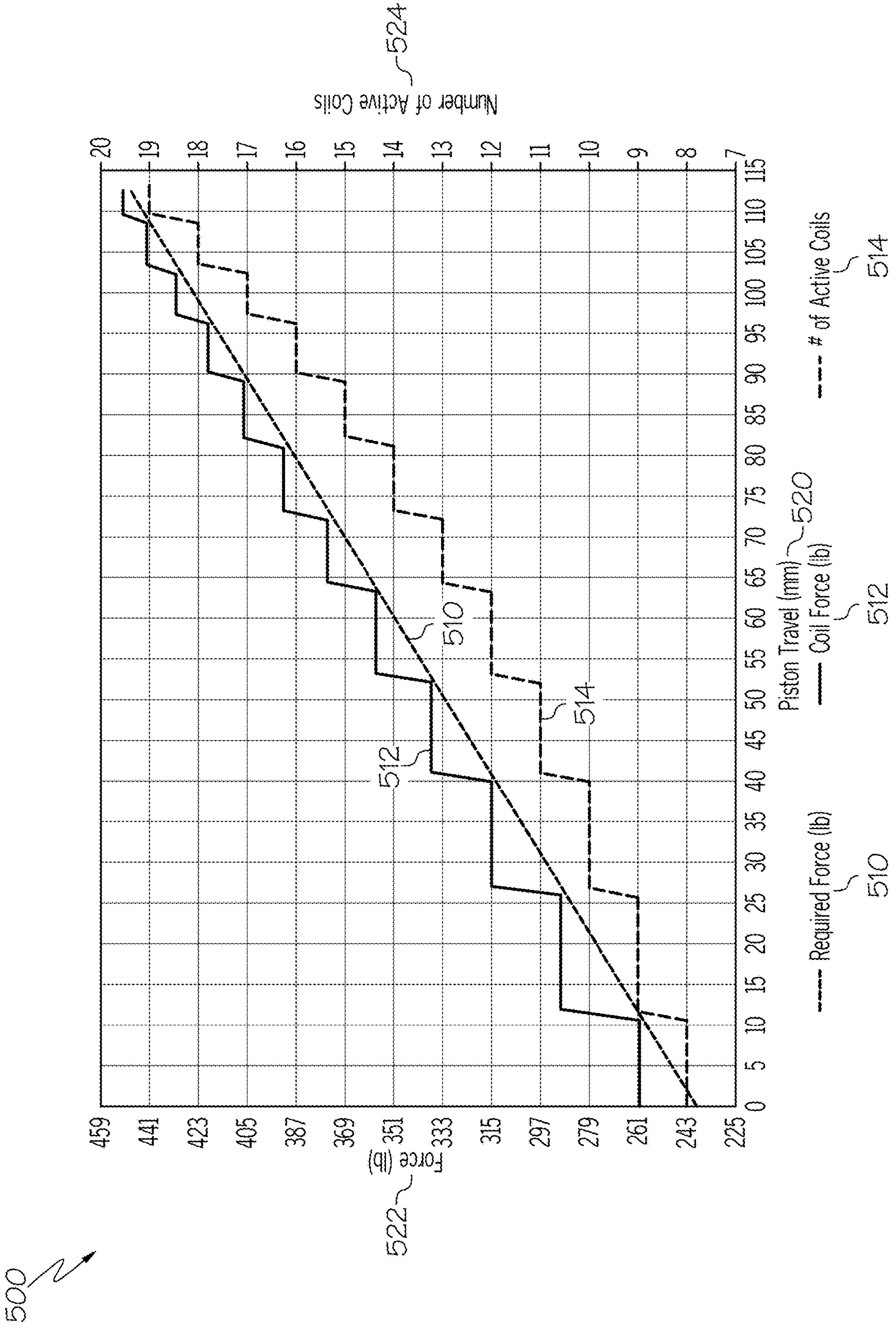
FIG. 26 is a graph illustrating the force generated by a number of active coils needed to return the driver of the fourth embodiment fastener driving tool of FIG. 24, versus the piston travel.

Referring now to FIG. 26, a graph 500 illustrates how many coils are needed at a given time interval to lift the driver back to the ready position. The graph 500 has three axes: a piston travel X-axis 520 in millimeters (mm), a force Y-axis 522 in pounds (lbs.), and a number of active coils Y-axis 524. These three axes are marked on the graph 500 as three linear sides of a rectangle. There are also three separate graphical representations of variables: a required force 510 (in pounds), a coil force 512 (in pounds), and a number of active coils 514. The required force 510 line is in small dashes, the coil force 512 line is solid, and the number of active coils 514 line is in long dashes.

The graphical representations were calculated based on the center of the piston being 6 mm from the active coils. The graph 500 generally shows that the number of coils needed to lift increases as the piston travels closer to its ready position, due to the increased compaction of the pressurized gas in the pressure chamber. For example, note that the first 10 mm of piston travel requires only eight (8) active coils applying 261 lbs. of force. However, by the time the ready position is reached, the piston needs to have travelled 110 mm, requiring 19 active coils applying approximately 450 lbs. of force.

It should be noted that this graph 500 was calculated using one of the 53-stage coil assembly embodiments. Note also that all fifty-three (53) coils are never activated simultaneously. The coils are turned on and off in stages as the piston is lifted towards a ready position, so at any one time only a few coils are in use.

Electronic Controller for Multi-Stage Coils

The third and fourth embodiments described above each include a rather large number of stages for their main induction coils 300 and 400. In fact, each induction coil 300 and 400 includes fifty-three (53) individual coil stages, each of which needs to be supplied with electrical current by way of a driver circuit, similar to the driver circuits 180, 182, 184, and 186 that are depicted in FIGS. 13 and 14 for the second embodiment. It is recommended that each of the fifty-three (53) coil stages for the induction coils 300 and 400 have their own individual driver circuits, even though several of the coil stages are often (or perhaps always) driven at the same time intervals as some of their adjacent coil stages.

In short, an electrical block diagram for the third embodiment would have the same components as illustrated on FIG. 13 or FIG. 14, except that there would be fifty-three (53) coil driver circuits similar to Coil Driver #1 at reference numeral 180, and there would be fifty-three (53) induction coils similar to coil "C1" at reference numeral 130. The other sensors and driver circuits, along with the system controller components, would still be included for the third embodiment, including a battery.

Similarly, an electrical block diagram for the fourth embodiment also would have the same components as illustrated on FIG. 13 or FIG. 14, and again there would be fifty-three (53) coil driver circuits similar to Coil Driver #1 at reference numeral 180, and there would be fifty-three (53) induction coils similar to coil "C1" at reference numeral 130. Furthermore, the other sensors and driver circuits, along with the system controller components, would still be included for the fourth embodiment, but in this instance, there would be no battery. Instead, a power cord would be used for connecting the tool to line voltage, such as single-phase 120 VAC, 60 Hz. There would still be a DC power supply (similar to reference number 46 on FIG. 14) to provide relatively low DC voltage to the processing circuit and other sensors and drivers, but its source would be alternating current rather than a battery. This fourth embodiment would likely also include a "high voltage" power supply, similar to reference numeral 47 on FIG. 14, except it would source its energy from the AC line voltage instead of from a battery.

Advantage: Fewer Moving Parts

Conventional fastener driving tools have certain mechanical moving parts that must properly function for the tool to operate. For example, "air tools" include certain air valves to, first set the piston in motion (in a "driving" stroke) to drive a fastener, and then to move the piston in the opposite direction (in a "lifting" or "return" stroke). To perform those functions, first a pilot valve is actuated by a human user pulling on the tool's trigger; the pilot valve then causes a much larger "main valve" to be actuated, which dumps compressed air into the cylinder, which forces the piston to move in the driving stroke; finally, another valve or two must close the main valve, and must also open a passageway to allow compressed air "under" the piston to "lift" that piston back to its starting position. These air valves are all moving parts, and they can wear out or get clogged with dirt, or otherwise simply break-thus making the tool inoperative.

The FUSION® line of gas-spring tools sold by Kyocera Senco Industrial Tools also has some moving parts, mostly relating to "lifting" the piston back to its starting position. These Senco lifters are quite robust, but they still can become misaligned with the driver blade if a nail jams the driver during a driving stroke, and perhaps something else could become broken or worn out in the mechanical lifting hardware, over many thousands of operating cycles. Nevertheless, the FUSION tools are a reliability improvement, since there are no air valves that need to be actuated to begin a driving stroke.

In the technology disclosed herein, the only significant moving part is the latch. (This statement, of course, ignores the movable piston and driver, which cannot be eliminated in these tools, unless one intends to make them into "rail guns.") And the Senco FUSION® tools already include a similar latch, which means that the various embodiments disclosed herein essentially have no moving parts, when compared to the prior conventional FUSION tools. Of course, most fastener driving tools also include a movable trigger and a movable safety contact element, but again, those parts cannot be eliminated, even if these tools someday evolve into rail guns. Fewer moving parts equals greater reliability.

It will be further understood that any type of product described herein that has moving parts, or that performs functions (such as computers with processing circuits and memory circuits), should be considered a "machine," and not merely as some inanimate apparatus. Such "machine" devices should automatically include power tools, printers, electronic locks, and the like, as those example devices each have certain moving parts. Moreover, a computerized device that performs useful functions should also be considered a machine, and such terminology is often used to describe many such devices; for example, a solid-state telephone answering machine may have no moving parts, yet it is commonly called a "machine" because it performs well-known useful functions.

Additionally, it will be understood that a computing product that includes a display to show information to a human user, and that also includes a "user operated input circuit" so the human user is able to enter commands or data, can be provided with a single device that is known as a "touchscreen display." In other words, if a patent claim recites a "display" and a "user operated input circuit" as two separate elements, then a single touchscreen display, in actually, is exactly the same thing. It should be noted that a touchscreen display usually includes a virtual keypad, and therefore, a "user operated input circuit" typically comprises a virtual keypad, particularly on smart phones and on tablet computers. Moreover, in this situation, the word "virtual" means that it is not a hardware keypad; more specifically, "virtual" means that it is formed (i.e., "created") on the display screen because of software being executed by a processing circuit.

As used herein, the term "proximal" can have a meaning of closely positioning one physical object with a second physical object, such that the two objects are perhaps adjacent to one another, although it is not necessarily required that there be no third object positioned therebetween. In the technology disclosed herein, there may be instances in which a "male locating structure" is to be positioned "proximal" to a "female locating structure." In general, this could mean that the two male and female structures are to be physically abutting one another, or this could mean that they are "mated" to one another by way of a particular size and shape that essentially keeps one structure oriented in a predetermined direction and at an X-Y (e.g., horizontal and vertical) position with respect to one another, regardless as to whether the two male and female structures actually touch one another along a continuous surface. Or, two structures of any size and shape (whether male, female, or otherwise in shape) may be located somewhat near one another, regardless if they physically abut one another or not; such a relationship could still be termed "proximal." Or, two or more possible locations for a particular point can be specified in relation to a precise attribute of a physical object, such as being "near" or "at" the end of a stick; all of those possible near/at locations could be deemed "proximal" to the end of that stick. Moreover, the term "proximal" can also have a meaning that relates strictly to a single object, in which the single object may have two ends, and the "distal end" is the end that is positioned somewhat farther away from a subject point (or area) of reference, and the "proximal end" is the other end, which would be positioned somewhat closer to that same subject point (or area) of reference.

It will be understood that the various components that are described and/or illustrated herein can be fabricated in various ways, including in multiple parts or as a unitary part for each of these components, without departing from the principles of the technology disclosed herein. For example, a component that is included as a recited element of a claim hereinbelow may be fabricated as a unitary part; or that component may be fabricated as a combined structure of several individual parts that are assembled together. But that "multi-part component" will still fall within the scope of the claimed, recited element for infringement purposes of claim interpretation, even if it appears that the claimed, recited element is described and illustrated herein only as a unitary structure.

All documents cited in the Background and in the Detailed Description are, in relevant part, incorporated herein by reference; the citation of any document is not to be construed as an admission that it is prior art with respect to the technology disclosed herein.

The foregoing description of a preferred embodiment has been presented for purposes of illustration and description. It is not intended to be exhaustive or to limit the technology disclosed herein to the precise form disclosed, and the technology disclosed herein may be further modified within the spirit and scope of this disclosure. Any examples described or illustrated herein are intended as non-limiting examples, and many modifications or variations of the examples, or of the preferred embodiment(s), are possible in light of the above teachings, without departing from the spirit and scope of the technology disclosed herein. The embodiment(s) was chosen and described in order to illustrate the principles of the technology disclosed herein and its practical application to thereby enable one of ordinary skill in the art to utilize the technology disclosed herein in various embodiments and with various modifications as are suited to particular uses contemplated. This application is therefore intended to cover any variations, uses, or adaptations of the technology disclosed herein using its general principles. Further, this application is intended to cover such departures from the present disclosure as come within known or customary practice in the art to which this technology disclosed herein pertains and which fall within the limits of the appended claims.

What is claimed is:

1. A fastener driving tool with closed system lifter, comprising:
- (a) a guide body that has a receiving end, an exit end, and a passageway therebetween, said guide body being physically configured to receive a fastener;
- (b) a cylinder comprising a cylindrical wall and including a piston therewithin, said cylinder including a first end and a second, opposite end, said cylinder containing a displacement volume created by a stroke of said piston;
- (c) a driver including a first end and a second end, said first end being in mechanical communication with said piston, said second end being sized and shaped to push the fastener from said exit end of the guide body; and
- (d) an induction coil that is wound at least partially around said cylinder;
- (e) wherein:
  - (i) said displacement volume contains a pressurized gas, and said pressurized gas is not exhausted to atmosphere after a driving stroke, but instead is re-used for a plurality of operating cycles;
  - (ii) said cylinder and piston act as a gas spring during the driving stroke to move said driver toward a driven position, using said pressurized gas of said displacement volume acting on said piston; and
  - (iii) said induction coil is energized during a lifting stroke of an operating cycle of the plurality of operating cycles to move said piston by use of a magnetic field toward a ready position;

wherein:

said induction coil comprises a single-stage inductor with a winding including multiple turns around said cylindrical wall of the cylinder.

2. The fastener driving tool of claim 1, wherein said induction coil comprises a multi-stage inductor subassembly with a plurality of electrically separate windings, each winding of the plurality of electrically separate windings including multiple turns around said cylindrical wall of the cylinder.

3. The fastener driving tool of claim 1, further comprising a housing that substantially contains said cylinder, said driver, and said induction coil, with no external energy source cable and no external hose.

4. The fastener driving tool of claim 1, further comprising:

a main storage chamber that, during a driving stroke of a plurality of driving strokes of said operating cycle, is in fluidic communication with said displacement volume of the cylinder, wherein said main storage chamber and said displacement volume contain said pressurized gas, wherein said pressurized gas is not exhausted to atmosphere after said driving stroke, but instead is re-used for the plurality of said operating cycles.

5. The fastener driving tool of claim 1, wherein said cylinder and piston act as a gas spring to move said driver toward the driven position under first predetermined conditions.

6. The fastener driving tool of claim 1, wherein the induction coil moves the driver toward the ready position under second predetermined conditions.

7. The fastener driving tool of claim 1, wherein: said driver exhibits an irregular shape along at least one surface, such that said irregular shape of the driver comprises:
- (a) a longitudinal edge with a plurality of spaced-apart protrusions; or (b) a plurality of spaced-apart openings along a longitudinal surface.

8. The fastener driving tool of claim 7, further comprising a latch;

wherein:

(a) if said latch is in a first operating state, then said latch holds said driver at said ready position by way of a mechanical contact with said irregular shape of the driver; and (b) if said latch is in a second operating state, then said latch releases said mechanical contact with said driver, thereby releasing the driver from said ready position and initiating said driving stroke.

9. The fastener driving tool of claim 7, further comprising a latch;

wherein:

(a) when said piston is moved to said ready position, said induction coil temporarily holds said piston at said ready position until said latch is engaged; and (b) thereafter, said induction coil is de-energized and said latch continues to hold said piston in place by use of a mechanical contact between said latch and said irregular shape of the driver.

10. The fastener driving tool of claim 1, further comprising:

(a) an electronic control circuit, including: a processing circuit, a memory circuit including instructions executable by the processing circuit, an input/output interface circuit, and an induction coil driver circuit.

11. The fastener driving tool of claim 1, further comprising: a magazine including a plurality of fasteners, one of the plurality of fasteners being fed to said guide body for one driving stroke of a plurality of driving strokes.

12. The fastener driving tool of claim 1, wherein a source of electrical energy comprises at least one of: (a) a battery; and (b) an electrical power cable that derives AC power from line voltage.

13. The fastener driving tool of claim 2, wherein said plurality of electrically separate windings are energized in a predetermined sequence during said lifting stroke.

14. A fastener driving tool with closed system lifter, comprising:

a housing that contains a pressurized gas, a cylinder that includes a piston, a driver that is in mechanical communication with said piston at least during a driving stroke, an induction coil that is in magnetic communication with said piston at least during a lifting stroke, a latch, and a source of electrical energy;

a guide body that has a receiving end, an exit end, and a passageway therebetween, said guide body being physically configured to receive a fastener of a plurality of fasteners;

a magazine including said plurality of fasteners, one of said fasteners being fed to said guide body for one of said driving strokes;

a solenoid that controls a position of said latch; and an electronic control circuit, including: a processing circuit, a memory circuit including instructions executable by the processing circuit, an input/output interface circuit, a solenoid driver circuit, and an induction coil driver circuit;

wherein:

said cylinder is configured to use the pressurized gas to propel said piston toward a driven position during said driving stroke;

said induction coil is configured use a magnetic field to propel said piston toward a ready position during said lifting stroke;

said induction coil comprises a multi-stage coil including a plurality of individual electrical inductors;

said induction coil driver circuit comprises a plurality of outputs, at least one output for each of said plurality of individual electrical inductors;

during said lifting stroke, said electronic control circuit is configured to control said induction coil driver circuit so as to energize at least one of said plurality of individual electrical inductors in a predetermined sequence; and said latch is configured to hold said driver at said ready position after said lifting stroke.

15. The fastener driving tool of claim 14, wherein: said multi-stage coil extends beyond an end of piston travel within said cylinder.

16. A method for using a fastener driving tool with closed system lifter, said method comprising:

(a) providing a housing that contains a pressurized gas, a cylinder that includes a piston, a driver that is in mechanical communication with said piston at least during a driving stroke, an induction coil that is in magnetic communication with said piston at least during a lifting stroke, a magazine with a plurality of fasteners, a latch, a solenoid that controls a position of said latch, an electronic control circuit, including: a processing circuit, a memory circuit including instructions executable by the processing circuit, an input/output interface circuit, a solenoid driver circuit, and an induction coil driver circuit, and a source of electrical energy;

(b) before actuation of a driving stroke, positioning said latch to hold the driver at a ready position;

(c) upon actuation of said driving stroke:

(i) engaging said latch to change positions and release the driver; and (ii) by use of said pressurized gas, propelling said piston toward a driven position, thereby moving said driver to force a fastener of the plurality of fasteners from the housing;

(d) after completion of said driving stroke, initiating said lifting stroke by:

(i) energizing said induction coil to produce a magnetic field;

(ii) by use of the magnetic field, propelling said piston toward said ready position, thereby moving said driver toward the ready position;

(e) after completion of said lifting stroke:

(i) positioning said latch to hold said driver at the ready position, until another driving stroke; and (f) controlling said solenoid driver circuit to position the latch so as to release the driver to initiate said driving stroke, and later to position the latch so as to physically engage and hold the driver once the driver reaches said ready position; and (g) controlling said induction coil driver circuit to energize the induction coil so as to initiate said lifting stroke, and keeping the induction coil energized until the driver reaches said ready position and until the latch has moved to a holding position.

17. The method of claim 16, wherein:

(a) said induction coil comprises a multi-stage coil including a plurality of individual electrical inductors;

(b) said induction coil driver circuit comprises a plurality of outputs, at least one output for each of said plurality of individual electrical inductors; and (c) during said lifting stroke, controlling said induction coil driver circuit and energizing at least one of said plurality of individual electrical inductors in a predetermined sequence.

18. A fastener driving tool with closed system lifter, comprising:

(a) a housing that contains a pressurized gas, a cylinder that includes a piston, (b) a driver that is in mechanical communication with said piston at least during a driving stroke, (c) an induction coil that is in magnetic communication with said piston at least during a lifting stroke, (d) a latch, (e) a source of electrical energy (f) a guide body that has a receiving end, an exit end, and a passageway therebetween, said guide body being physically configured to receive a fastener of a plurality of fasteners;

(g) a magazine including said plurality of fasteners, one of said fasteners being fed to said guide body for said driving stroke;

(h) a solenoid that controls a position of said latch; and (i) an electronic control circuit, including: a processing circuit, a memory circuit including instructions executable by the processing circuit, an input/output interface circuit, a solenoid driver circuit, and an induction coil driver circuit;

wherein:

said cylinder is configured to use the pressurized gas to propel said piston toward a driven position during said driving stroke;

said induction coil is configured use a magnetic field to propel said piston toward a ready position during said lifting stroke;

said latch is configured to hold said driver at said ready position; and said induction coil is wound around said cylinder and extends past an end of said cylinder in a direction of said lifting stroke.

19. The fastener driving tool of claim 18, wherein:

(a) said induction coil comprises a multi-stage coil including a plurality of individual electrical inductors;

(b) said induction coil driver circuit comprises a plurality of outputs, at least one output for each of said plurality of individual electrical inductors; and (c) during said lifting stroke, said electronic control circuit is configured to control said induction coil driver circuit so as to energize at least one of said plurality of individual electrical inductors in a predetermined sequence.

20. The fastener driving tool of claim 19, wherein: said multi-stage coil includes at least four individual electrical inductors.

* * * * *